(12) United States Patent
Lu et al.

(10) Patent No.: US 10,362,155 B2
(45) Date of Patent: Jul. 23, 2019

(54) METHOD, BASE STATION, AND TERMINAL FOR WIRELESS LINK PROCESSING

(71) Applicant: ZTE CORPORATION, Shenzhen, Guangdong Province (CN)

(72) Inventors: Zhaohua Lu, Shenzhen (CN); Yijian Chen, Shenzhen (CN); Yu Ngok Li, Shenzhen (CN); Guanghui Yu, Shenzhen (CN); Kun Liu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 32 days.

(21) Appl. No.: 15/504,327

(22) PCT Filed: Apr. 3, 2015

(86) PCT No.: PCT/CN2015/075862
§ 371 (c)(1),
(2) Date: Jun. 28, 2017

(87) PCT Pub. No.: WO2015/154642
PCT Pub. Date: Oct. 15, 2015

(65) Prior Publication Data
US 2017/0302776 A1    Oct. 19, 2017

(30) Foreign Application Priority Data
Aug. 21, 2014 (CN) .......................... 2014 1 0416492

(51) Int. Cl.
*H04B 7/04* (2017.01)
*H04B 7/06* (2006.01)
*H04L 1/00* (2006.01)
*H04L 1/18* (2006.01)
(Continued)

(52) U.S. Cl.
CPC ............ *H04M 1/7253* (2013.01); *H04B 7/04* (2013.01); *H04B 7/063* (2013.01); *H04B 7/0617* (2013.01);
(Continued)

(58) Field of Classification Search
CPC ..... H04M 1/7253; H04B 17/309; H04B 7/04; H04B 7/0617; H04B 7/063; H04L 1/0003;
(Continued)

(56) References Cited

U.S. PATENT DOCUMENTS 8,614,646 B2 * 12/2013 Zhang .................... H01Q 1/241
343/722
2003/0198204 A1 * 10/2003 Taneja .................... H04L 5/023
370/332
(Continued)

FOREIGN PATENT DOCUMENTS

CN        101155012 A     4/2008
CN        101499876 A     8/2009
(Continued)

OTHER PUBLICATIONS

Dinh-Thuy Phan-Huy et al., Large MISO Beamforming for High Speed Vehicles Using Separate Receive & Training Antennas, 2013 IEEE 5th International Symposium on Wireless Vehicular Communications (WIVEC), IEEE, Jun. 2, 2013, pp. 1-5, XP32547593.
(Continued)

*Primary Examiner* — Qun Shen
(74) *Attorney, Agent, or Firm* — Knobbe, Martens, Olson & Bear, LLP

(57) ABSTRACT

A method, for realizing wireless link processing, a base station and a terminal are disclosed. The method includes: a first communication node receiving reference information from a second communication node and determining link
(Continued)

information for performing wireless link communication; and the first communication node communicating with the second communication node according to the determined link information. In the technical solution of the present document, the link information for performing the wireless link communication is determined according to the reference information of the second communication node as a receiving party, to realize that the first communication node communicates with the second communication node according to the determined link information.

14 Claims, 2 Drawing Sheets

(51) Int. Cl.
| | |
|---|---|
| H04M 1/725 | (2006.01) |
| H04B 17/309 | (2015.01) |
| H04L 12/46 | (2006.01) |
| H04W 72/06 | (2009.01) |
| H04W 88/06 | (2009.01) |
| H04W 72/12 | (2009.01) |
| H04L 5/00 | (2006.01) |

(52) U.S. Cl.
CPC ......... *H04B 17/309* (2015.01); *H04L 1/0003* (2013.01); *H04L 1/1867* (2013.01); *H04L 12/4604* (2013.01); *H04W 72/06* (2013.01); *H04W 72/1236* (2013.01); *H04W 88/06* (2013.01); *H04L 5/0048* (2013.01)

(58) Field of Classification Search
CPC .. H04L 1/1867; H04L 12/4604; H04W 72/06; H04W 72/1236; H04W 88/06
See application file for complete search history.

(56) References Cited

U.S. PATENT DOCUMENTS

| | | | | |
|---|---|---|---|---|
| 2004/0162083 | A1* | 8/2004 | Chen | H04W 52/286 |
| | | | | 455/454 |
| 2006/0104301 | A1* | 5/2006 | Beyer | H04J 3/0667 |
| | | | | 370/445 |
| 2006/0146721 | A1* | 7/2006 | Attar | H04L 1/0002 |
| | | | | 370/238 |
| 2008/0095198 | A1* | 4/2008 | Wager | H04L 47/10 |
| | | | | 370/519 |
| 2010/0255790 | A1* | 10/2010 | Farajidana | H04B 7/0695 |
| | | | | 455/69 |
| 2010/0329119 | A1* | 12/2010 | Zorba Barah | H04W 72/087 |
| | | | | 370/235 |
| 2011/0176593 | A1* | 7/2011 | Hultell | H04B 7/0404 |
| | | | | 375/224 |
| 2013/0051310 | A1* | 2/2013 | Kim | H04L 5/0023 |
| | | | | 370/315 |
| 2014/0062785 | A1* | 3/2014 | Kim | G01S 7/032 |
| | | | | 342/368 |
| 2014/0179332 | A1 | 6/2014 | Qian et al. | |
| 2015/0215793 | A1* | 7/2015 | Siomina | G01S 5/0205 |
| | | | | 455/456.1 |

FOREIGN PATENT DOCUMENTS

| | | |
|---|---|---|
| CN | 102362518 A | 2/2012 |
| CN | 102769879 A | 11/2012 |
| CN | 102771062 A | 11/2012 |
| CN | 103546976 A | 1/2014 |
| CN | 103609045 A | 2/2014 |
| CN | 103812619 A | 5/2014 |
| EP | 2892269 A1 | 7/2015 |
| WO | 2014035218 A1 | 3/2014 |
| WO | 2014070066 A1 | 5/2014 |
| WO | 2014088185 A1 | 6/2014 |

OTHER PUBLICATIONS

Dinh-Thuy Phan-Huy et al., Adaptive Large MISO Downlink with Predictor Antenna Array for very fast moving vehicle, 2013 International Conference on Connected Vehicles and Expo (ICCVE), IEEE, Dec. 2, 2013, pp. 331-336, XP32587610.

* cited by examiner

METHOD, BASE STATION, AND TERMINAL FOR WIRELESS LINK PROCESSING

TECHNICAL FIELD

The present document relates to the technology of realizing wireless link processing, and in particular, to a method, base station and terminal for realizing wireless link processing.

BACKGROUND

With the application and development of smart terminals such as smart phones, tablet computers etc., for example, cloud computing, Internet of Things, mobile video telephony and conferences, online games, online music and picture downloads, etc. lead to large-scale increase in users of the wireless communication network, resulting in explosive growth of wireless data services. It is predicted that in the next 10 years, wireless data services will grow about 1000 times, with an average growth per year of about 2 times.

In order to adapt to the growth of wireless data services, at present, the capacity of the wireless communication network is mainly enhanced by increasing the bandwidth of the spectrum, strengthening the service flow division, enhancing network density, improving the efficiency of the spectrum, etc. By improving the capacity of the wireless communication network, the quality of service of the wireless data services in a normal environment can be improved. With the explosive growth of the wireless data services, users desire to get better quality of service in a variety of scenarios. High-speed mobile vehicles (buses, cars, trains, ships, airplanes etc.) are a scenario where users desire to get better quality of service. Currently, in order to provide users with good quality of service in high-speed mobile vehicles, it is mainly achieved by installing a relay station on a vehicle, herein the relay station forwards downlink data transmitted by a base station (data transmitted by the base station to a terminal) to a terminal in the vehicle, and forwards uplink data transmitted by the terminal in the vehicle (data transmitted by the terminal to the base station) to a corresponding base station. However, when the vehicle is moving at a high speed, it will cause channel state information between the relay station and the base station not to be updated in time, which results in a problem of degradation of wireless link performance. In addition, in the future mobile communication systems, the large-scale antenna array technology is a key technology to enhance the efficiency of the spectrum. Due to a large number of antennas, a transmitting party may form a very thin spot beam, which not only proposes very high demands for the accuracy of the wireless channel between the transmitting party and a receiving party, but also proposes very high limitations on the movement speed of the receiving party. If the receiving party moves at a high speed, it is likely that when the transmitting party transmits data, the channel characteristics of the receiving party completely changes and the receiving completely leave coverage of the spot beam, resulting in degradation of the wireless link performance.

SUMMARY

The technical problem to be solved by the present document is to provide a method for realizing wireless link processing, a base station and a terminal, to improve the wireless link performance and enhance the quality of service of the entire mobile communication system.

In order to achieve the purpose of the present document, the following technical solutions are adopted.

A method for wireless link processing includes: a first communication node receiving reference information transmitted by a second communication node and determining link information for performing wireless link communication; and the first communication node communicating with the second communication node according to the determined link information.

In an exemplary embodiment, the reference information at least includes: antenna number information, antenna spacing information and movement speed information of the second communication node; or antenna number information and antenna spacing information of the second communication node; or total antenna group length information and movement speed information of the second communication node; or total antenna group length information of the second communication node; or antenna topology information and movement speed information of the second communication node; or antenna topology information of the second communication node; or a scheduling delay which is allowed when the first communication node communicates with the second communication node; or a period in which the first communication node transmits a downlink reference signal; or a period in which the second communication node transmits an uplink reference signal; or geographical position information and movement speed information of the second communication node; or geographical position information of the second communication node.

In an exemplary embodiment, when the reference information is antenna number information and antenna spacing information of the second communication node; or total antenna group length information of the second communication node; or antenna topology information of the second communication node; or geographical position information of the second communication node, the method further includes: testing by the first communication node to acquire the movement speed information.

In an exemplary embodiment, the link information at least includes: a scheduling delay which is allowed when the first communication node communicates with the second communication node; or a manner of transmitting service data by the first communication node; or a period in which the first communication node transmits a downlink reference signal; or a period in which the second communication node transmits an uplink reference signal.

In an exemplary embodiment, when the reference information is the scheduling delay information which is allowed when the first communication node communicates with the second communication node, the scheduling delay information which is allowed when the first communication node communicates with the second communication node is determined according to the movement speed information and antenna related information of the second communication node;

when the reference information is the period in which the first communication node transmits the downlink reference signal, the period in which the first communication node transmits the downlink reference signal is determined according to the movement speed information and antenna related information of the second communication node; and when the reference information is the period in which the second communication node transmits the uplink reference signal, the period in which the second communication node transmits the uplink reference signal is determined according to the movement speed information and antenna related information of the second communication node.

In an exemplary embodiment, the scheduling delay information which is allowed when the first communication node communicates with the second communication node is valid time of channel state information which is related to the second communication node and is acquired by the first communication node.

In an exemplary embodiment, when the reference information is the antenna number information, the antenna spacing information, and the movement speed information of the second communication node; or when the reference information is the antenna number information and the antenna spacing information of the second communication node, and the first communication node tests to acquire the movement speed information, determining the link information specifically includes:
  acquiring antenna group length information according to the antenna number information and the antenna spacing information; and
  according to the acquired antenna group length information and the movement speed information, acquiring a scheduling delay which is allowed when the first communication node communicates with the second communication node after receiving the latest channel state information of the second communication node, herein the scheduling delay is used as the link information for performing the wireless link communication; or acquiring a scheduling period for an uplink reference signal, as the link information for performing the wireless link communication; or acquiring a scheduling period for a downlink reference signal, as the link information for performing the wireless link communication;

when the reference information is the total antenna group length information and the movement speed information of the second communication node; or when the reference information is the total antenna group length information of the second communication node, and the first communication node tests to acquire the movement speed information, determining the link information specifically includes:
  according to the antenna group length information and the movement speed information, acquiring for performing the wireless link communication a scheduling delay which is allowed when the first communication node communicates with the second communication node after receiving the latest channel state information of the second communication node, herein the scheduling delay is used as the link information for performing wireless link communication; or acquiring a scheduling period for an uplink reference signal, as the link information for performing the wireless link communication; or acquiring a scheduling period for a downlink reference signal, as the link information for performing the wireless link communication;

when the reference information is the antenna topology information and the movement speed information of the second communication node; or when the reference information is the antenna topology information of the second communication node, and the first communication node tests to acquire the movement speed information, determining the link information specifically includes:
  acquiring antenna group length information according to the antenna topology information of the second communication node; and
  according to the acquired antenna group length information and movement speed information, acquiring for performing the wireless link communication a scheduling delay which is allowed when the first communication node communicates with the second communication node after receiving the latest channel state information of the second communication node, herein the scheduling delay is used as the link information for performing the wireless link communication; or acquiring a scheduling period for an uplink reference signal, as the link information for performing the wireless link communication; or acquiring a scheduling period for a downlink reference signal, as the link information for performing the wireless link communication; and when the reference information is the scheduling delay which is allowed when the first communication node communicates with the second communication node, determining the link information specifically includes: using directly the scheduling delay which is allowed when the first communication node communicates with the second communication node as the link information for performing the wireless link communication.

In an exemplary embodiment, acquiring the antenna group length information according to the antenna number information and the antenna spacing information specifically includes: subtracting 1 from an antenna number value in the antenna number information and then multiplying with the antenna spacing information, the result used as the antenna group length information;
  acquiring the scheduling period for the uplink reference signal according to the antenna group length information and the movement speed information specifically includes: using a value, which is less than or equal to a value obtained by dividing the antenna group length information by the movement speed information, as the scheduling period for the uplink reference signal; and
  acquiring the scheduling period for the downlink reference signal according to the antenna group length information and the movement speed information specifically includes: using a value, which is less than or equal to a value obtained by dividing the antenna group length information by the movement speed information as the scheduling period for the downlink reference signal.

In an exemplary embodiment, when the link information is the scheduling delay which is allowed when the first communication node communicates with the second communication node, the first communication node communicating with the second communication node according to the determined link information specifically includes: the first communication node communicating with the second communication node based on the latest channel state information within the scheduling delay which is allowed when the first communication node communicates with the second communication node; or the first communication node scheduling resources of a wide beam which is sufficient to cover a candidate receiving antenna group of the second communication node outside the scheduling delay which is allowed when the first communication node communicates with the second communication node, to communicate with the second communication node;

when the link information is the scheduling period for the uplink reference signal, the first communication node communicating with the second communication node according to the determined link information specifically includes: the first communication node notifying the second communication node of the scheduling period for the uplink reference signal to perform communication; and when the link information is the scheduling period for the downlink reference signal, the first communication node communicating with the second communication node according to the determined link information specifically includes: the first communication node notifying the second communication node of the scheduling period for the downlink reference signal to perform communication.

In an exemplary embodiment, when the reference information is the period in which the first communication node transmits the downlink reference signal, determining the link information specifically includes: determining the period in which the first communication node transmits the downlink reference signal as the link information for performing the wireless link communication; and when the reference information is the period in which the second communication node transmits the uplink reference signal, determining the link information specifically includes: determining the period in which the second communication node transmits the uplink reference signal as the link information for performing the wireless link communication.

In an exemplary embodiment, when the link information is the period in which the first communication node transmits the downlink reference signal, the first communication node communicating with the second communication node according to the determined link information specifically includes: presetting a manner of communication according to the period in which the first communication node transmits the downlink reference signal; and when the link information is the period in which the second communication node transmits the uplink reference signal, the first communication node communicating with the second communication node according to the determined link information specifically includes: presetting a manner of communication according to the period in which the second communication node transmits the uplink reference signal.

In an exemplary embodiment, when the reference information is the geographical position information and the movement speed information of the second communication node; or, when the reference information is the geographical position information of the second communication node, and the first communication node tests to acquire the movement speed information, determining the link information specifically includes: using the geographical position information and the movement speed information of the second communication node, as the link information for performing the wireless link communication.

In an exemplary embodiment, when the link information is the geographical position information and the movement speed information of the second communication node, performing the communication according to the determined link information specifically includes: predicting a channel condition for scheduling resources to the second communication node according to the geographical position information and the movement speed information, and selecting a service data transmission manner to perform the communication.

In an exemplary embodiment, predicting the channel condition for scheduling resources to the second communication node according to the geographical position information and the movement speed information, and selecting the service data transmission manner to perform the communication specifically includes: according to an electronic map including channel state information in combination with the geographical position information and the movement speed information, predicting the channel condition for scheduling resources to the second communication node, and selecting the service data transmission manner to perform the communication.

On another aspect, the present application further provides a method for realizing wireless link processing, including: a second communication node transmitting reference information to a first communication node; and the first communication node receiving the reference information from the second communication node, determining link information for performing wireless link communication, and communicating with the second communication node according to the determined link information.

In an exemplary embodiment, the reference information at least includes: antenna number information, antenna spacing information and movement speed information of the second communication node; or antenna number information and antenna spacing information of the second communication node; or total antenna group length information and movement speed information of the second communication node; or total antenna group length information of the second communication node; or antenna topology information and movement speed information of the second communication node; or antenna topology information of the second communication node; or a scheduling delay which is allowed when the first communication node communicates with the second communication node; or a period in which the second communication node transmits an uplink reference signal; or a period in which the first communication node transmits a downlink reference signal; or geographical position information and movement speed information of the second communication node; or geographical position information of the second communication node.

In an exemplary embodiment, when the reference information is antenna number information and antenna spacing information of the second communication node; or total antenna group length information of the second communication node; or antenna topology information of the second communication node; or geographical position information of the second communication node, the method further includes: testing by the first communication node to acquire the movement speed information.

In an exemplary embodiment, the link information at least includes: a scheduling delay which is allowed when the first communication node communicates with the second communication node; or a manner of transmitting service data by the first communication node; or a period in which the first communication node transmits a downlink reference signal; or a period in which the second communication node transmits an uplink reference signal.

In an exemplary embodiment, when the reference information is the scheduling delay information which is allowed when the first communication node communicates with the second communication node, the scheduling delay information which is allowed when the first communication node communicates with the second communication node is determined according to the movement speed information and antenna related information of the second communication node;

when the reference information is the period in which the first communication node transmits the downlink reference signal, the period in which the first communication node transmits the downlink reference signal is determined according to the movement speed information and antenna related information of the second communication node; and when the reference information is the period in which the second communication node transmits the uplink reference signal, the period in which the second communication node transmits the uplink reference signal is determined according to the movement speed information and antenna related information of the second communication node.

In an exemplary embodiment, the scheduling delay information which is allowed when the first communication node communicates with the second communication node is valid time of channel state information which is related to the second communication node and is acquired by the first communication node.

In an exemplary embodiment, when the reference information is the antenna number information, the antenna spacing information, and the movement speed information of the second communication node; or when the reference information is the antenna number information and the antenna spacing information of the second communication node, and the first communication node tests to acquire the movement speed information, determining the link information specifically includes:

acquiring antenna group length information according to the antenna number information and the antenna spacing information; and according to the acquired antenna group length information and the movement speed information, acquiring a scheduling delay which is allowed when the first communication node communicates with the second communication node after receiving the latest channel state information of the second communication node, herein the scheduling delay is used as the link information for performing the wireless link communication; or acquiring a scheduling period for an uplink reference signal, as the link information for performing the wireless link communication; or acquiring a scheduling period for a downlink reference signal, as the link information for performing the wireless link communication;

when the reference information is the antenna group length information and the movement speed information of the second communication node; or when the reference information is the total antenna group length information of the second communication node, and the first communication node tests to acquire the movement speed information, determining the link information specifically includes:

according to the antenna group length information and the movement speed information, acquiring for performing the wireless link communication a scheduling delay which is allowed when the first communication node communicates with the second communication node after receiving the latest channel state information of the second communication node, herein the scheduling delay is used as the link information for performing wireless link communication; or acquiring a scheduling period for an uplink reference signal, as the link information for performing the wireless link communication; or acquiring a scheduling period for a downlink reference signal, as the link information for performing the wireless link communication;

when the reference information is the antenna topology information and the movement speed information of the second communication node; or when the reference information is the antenna topology information of the second communication node, and the first communication node tests to acquire the movement speed information, determining the link information specifically includes:

acquiring antenna group length information according to the antenna topology information of the second communication node; and according to the acquired antenna group length information and movement speed information, acquiring for performing the wireless link communication a scheduling delay which is allowed when the first communication node communicates with the second communication node after receiving the latest channel state information of the second communication node, herein the scheduling delay is used as the link information for performing wireless link communication; or acquiring a scheduling period for an uplink reference signal, as the link information for performing the wireless link communication; or acquiring a scheduling period for a downlink reference signal, as the link information for performing the wireless link communication; and when the reference information is the scheduling delay which is allowed when the first communication node communicates with the second communication node, determining the link information specifically includes: using directly the scheduling delay which is allowed when the first communication node communicates with the second communication node as the link information for performing the wireless link communication.

In an exemplary embodiment, acquiring the antenna group length information according to the antenna number information and the antenna spacing information specifically includes: subtracting 1 from an antenna number value in the antenna number information and then multiplying with the antenna spacing information, the result used as the antenna group length information;

acquiring the scheduling period for the uplink reference signal according to the antenna group length information and the movement speed information specifically includes: using a value, which is less than or equal to a value obtained by dividing the antenna group length information by the movement speed information, as the scheduling period for the uplink reference signal; and acquiring the scheduling period for the downlink reference signal according to the antenna group length information and the movement speed information specifically includes: using a value, which is less than or equal to a value obtained by dividing the antenna group length information by the movement speed information as the scheduling period for the downlink reference signal.

In an exemplary embodiment, when the link information is the scheduling delay which is allowed when the first communication node communicates with the second communication node, the second communication node communicating with the first communication node according to the determined link information specifically includes: the first communication node communicating with the second communication node based on the latest channel state information within the scheduling delay which is allowed when the first communication node communicates with the second communication node; or the first communication node scheduling resources of a wide beam which is sufficient to cover a candidate receiving antenna group of the second communication node outside the scheduling delay which is allowed when the first communication node communicates with the second communication node, to communicate with the second communication node;

when the link information is the scheduling period for the uplink reference signal, the second communication node communicating with the first communication node according to the determined link information specifically includes: the first communication node notifying the second communication node of the scheduling period for the uplink reference signal to perform communication; and when the link information is the scheduling period for the downlink reference signal, the second communication node communicating with the first communication node according to the determined link information specifically includes: the first communication node notifying the second communication node of the scheduling period for the downlink reference signal to perform communication.

In an exemplary embodiment, when the reference information is the period in which the first communication node transmits the downlink reference signal, determining the link information specifically includes: determining the period in which the first communication node transmits the downlink reference signal as the link information for performing the wireless link communication; and when the reference information is the period in which the second communication node transmits the uplink reference signal, determining the link information specifically includes: determining the period in which the second communication node transmits the uplink reference signal as the link information for performing the wireless link communication.

In an exemplary embodiment, when the link information is the period in which the first communication node transmits the downlink reference signal, the second communication node communicating with the first communication node according to the determined link information specifically includes: presetting a manner of communication according to the period in which the first communication node transmits the downlink reference signal; and when the link information is the period in which the second communication node transmits the uplink reference signal, the second communication node communicating with the first communication node according to the determined link information specifically includes: presetting a manner of communication according to the period in which the second communication node transmits the uplink reference signal.

In an exemplary embodiment, when the reference information is the geographical position information and the movement speed information of the second communication node; or, when the reference information is the geographical position information of the second communication node, and the first communication node tests to acquire the movement speed information, determining the link information specifically includes: using the geographical position information and the movement speed information of the second communication node, as the link information for performing the wireless link communication.

In an exemplary embodiment, when the link information is the geographical position information and the movement speed information of the second communication node, the second communication node communicating with the first communication node according to the determined link information specifically includes: predicting a channel condition for scheduling resources to the second communication node according to the geographical position information and the movement speed information, and selecting a service data transmission manner to perform the communication.

In an exemplary embodiment, predicting the channel condition for scheduling resources to the second communication node according to the geographical position information and the movement speed information, and selecting the service data transmission manner to perform communication specifically includes: according to an electronic map including channel state information in combination with the geographical position information and the movement speed information, predicting the channel condition for scheduling resources to the second communication node, and selecting the service data transmission manner to perform communication.

In an exemplary embodiment, the second communication node transmitting the reference information of the second communication node to the first communication node is: when the movement speed information of the second communication node changes, the second communication node transmitting the reference information of the second communication node to the first communication node.

On still another aspect, the present application further provides a base station, including a link information determination unit and a communication unit. The link information determination unit is arranged to receive reference information from a second communication node and determine link information for performing wireless link communication; and the communication unit is arranged to communicate with the second communication node according to the determined link information.

In an exemplary embodiment, the reference information at least includes: antenna number information, antenna spacing information and movement speed information of the second communication node; or antenna number information and antenna spacing information of the second communication node; or total antenna group length information and movement speed information of the second communication node; or total antenna group length information of the second communication node; or antenna topology information and movement speed information of the second communication node; or antenna topology information of the second communication node; or a scheduling delay which is allowed when the base station communicates with the second communication node; or a period in which the second communication node transmits an uplink reference signal; or a period in which the base station transmits a downlink reference signal; or geographical position information and movement speed information of the second communication node; or geographical position information of the second communication node.

In an exemplary embodiment, the base station further includes a speed measurement unit. The speed measurement unit is arranged to, when the reference information is antenna number information and antenna spacing information of the second communication node; or total antenna group length information of the second communication node; or antenna topology information of the second communication node; or geographical position information of the second communication node, test to acquire the movement speed information.

In an exemplary embodiment, the link information at least includes: a scheduling delay which is allowed when the base station communicates with the second communication node; or a manner of transmitting service data by the second communication node; or a period in which the second communication node transmits an uplink reference signal, or a period in which the base station transmits a downlink reference signal.

In an exemplary embodiment, when the reference information is the scheduling delay information which is allowed when the base station communicates with the second communication node, the scheduling delay information which is allowed when the base station communicates with the second communication node is determined according to the movement speed information and antenna related information of the second communication node;

when the reference information is the period in which the base station transmits the downlink reference signal, the period in which the base station transmits the downlink reference signal is determined according to the movement speed information and antenna related information of the second communication node; and when the reference information is the period in which the second communication node transmits the uplink reference signal, the period in which the second communication node transmits the uplink reference signal is determined according to the movement speed information and antenna related information of the second communication node.

In an exemplary embodiment, the scheduling delay information which is allowed when the base station communicates with the second communication node is valid time of channel state information which is related to the second communication node and is acquired by the base station.

In an exemplary embodiment, the link information determination unit is further configured to, when the reference information is the antenna number information, the antenna spacing information, and the movement speed information of the second communication node; or when the reference information is the antenna number information and the antenna spacing information of the second communication node, and the speed measurement unit acquires the movement speed information, acquire antenna group length information according to the antenna number information and the antenna spacing information; and according to the acquired antenna group length information and the movement speed information, acquire a scheduling delay which is allowed when the base station communicates with the second communication node after receiving the latest channel state information of the second communication node, herein the scheduling delay is used as the link information for performing the wireless link communication; or, acquire a scheduling period for an uplink reference signal, as the link information for performing the wireless link communication; or, acquire a scheduling period for a downlink reference signal, as the link information for performing the wireless link communication;

when the reference information is the total antenna group length information and the movement speed information of the second communication node; or when the reference information is the total antenna group length information of the second communication node, and the speed measurement unit acquires the movement speed information, according to the antenna group length information and the movement speed information, acquire for performing the wireless link communication a scheduling delay which is allowed when the base station communicates with the second communication node after receiving the latest channel state information of the second communication node, herein the scheduling delay is used as the link information for performing wireless link communication; or acquire a scheduling period for an uplink reference signal, as the link information for performing the wireless link communication; or acquire a scheduling period for a downlink reference signal, as the link information for performing the wireless link communication;

when the reference information is the antenna topology information and the movement speed information of the second communication node; or when the reference information is the antenna topology information of the second communication node, and the speed measurement unit acquires the movement speed information, acquire antenna group length information according to the antenna topology information of the second communication node; and according to the acquired antenna group length information and movement speed information, acquire for performing the wireless link communication a scheduling delay which is allowed when the base station communicates with the second communication node after receiving the latest channel state information of the second communication node, herein the scheduling delay is used as the link information for performing wireless link communication; or acquire a scheduling period for an uplink reference signal, as the link information for performing the wireless link communication; or acquire a scheduling period for a downlink reference signal, as the link information for performing the wireless link communication; and when the reference information is the scheduling delay which is allowed when the base station communicates with the second communication node, use directly the scheduling delay which is allowed when the base station communicates with the second communication node as the link information for performing the wireless link communication.

In an exemplary embodiment, the communication unit includes a first communication module, a second communication module and a third communication module. The first communication module is arranged to, when the determined link information is the scheduling delay which is allowed when the base station communicates with the second communication node, communicate by the base station with the second communication node based on the latest channel state information within the scheduling delay which is allowed when the base station communicates with the second communication node; or, schedule by the base station resources of a wide beam which is sufficient to cover a candidate receiving antenna group of the second communication node outside the scheduling delay which is allowed when the base station communicates with the second communication node, to communicate with the second communication node.

The second communication module is arranged to, when the determined link information is the scheduling period for the uplink reference signal, notify by the base station the second communication node of the scheduling period for the uplink reference signal to perform resource scheduling; when the determined link information is the scheduling period for the downlink reference signal, notify by the base station the second communication node of the scheduling period for the downlink reference signal to perform communication; when the determined link information is the period in which the base station transmits the downlink reference signal, preset a manner of communication according to the period in which the base station transmits the downlink reference signal; and when the determined link information is the period in which the second communication node transmits the uplink reference signal, preset a manner of communication according to the period in which the second communication node transmits the uplink reference signal.

The third communication module is arranged to, when the determined link information is the geographical position information and the movement speed information of the second communication node, predict a channel condition for scheduling resources to the second communication node according to the geographical position information and the movement speed information, and select a service data transmission manner to perform the communication.

In an exemplary embodiment, the third communication module is further arranged to: according to an electronic map including the channel state information in combination with the geographical position information and the movement speed information predict the channel condition for scheduling resources to the second communication node, and select the service data transmission manner to perform the communication.

In still another aspect, the present application further provides a terminal, including a transmission unit and a link processing unit. The transmission unit is arranged to transmit reference information of the terminal to a first communication node, so that the first communication node receives the reference information of the terminal, determines link information for performing wireless link communication, and communicates with the terminal according to the determined link information; and the link processing unit is arranged to communicate with the first communication node according to the determined link information.

The transmission unit is further arranged to transmit to the first communication node the reference information which at least includes: antenna number information, antenna spacing information and movement speed information of the terminal; or antenna number information and antenna spacing information of the terminal; or total antenna group length information and movement speed information of the terminal; or total antenna group length information of the terminal; or antenna topology information and movement speed information of the terminal; or antenna topology information of the terminal; or a scheduling delay which is allowed when the first communication node communicates with the terminal; or a period in which the terminal transmits an uplink reference signal; or a period in which the first communication node transmits a downlink reference signal; or reference information which is geographical position information and movement speed information of the terminal; or geographical position information of the terminal, so that the first communication node determines the link information for performing the wireless link communication according to the reference information, and generates resource scheduling information according to the link information for performing the wireless link communication.

In an exemplary embodiment, the transmission unit is further arranged to, when the movement speed information of the terminal changes, transmit the reference information of the terminal to the first communication node, so that the first communication node determines the link information for performing the wireless link communication according to the reference information and generates resource scheduling information according to the link information for performing the wireless link communication.

Compared with the related art, the technical solution provided by the present document includes: a first communication node receiving reference information from a second communication node, and determining link information for performing wireless link communication; and the first communication node communicating with the second communication node according to the determined link information. In the technical solution of the present document, the link information for performing the wireless link communication is determined according to the reference information of the second communication node as a receiving party, to realize that the first communication node communicates with the second communication node according to the determined link information, which solves the problem of degradation of the wireless link performance under a high-speed mobile communication environment because the channel characteristics of the receiving party completely changes and the receiving party completely leave the coverage of the spot beam, and enhances the quality of service of the entire mobile communication system.

BRIEF DESCRIPTION OF DRAWINGS

The accompanying drawings are used to provide a further understanding of the technical solutions of the present application and constitute a part of the description. The accompanying drawings are used to explain the technical solutions of the present application together with the embodiments of the present application, and do not constitute a limitation on the technical solutions of the present application.

DETAILED DESCRIPTION

Embodiments of the present application will be described in detail below with reference to accompanying drawings. It should be illustrated that the embodiments in the present application and features in the embodiments can be combined with each other randomly without conflict.

Figure 1:
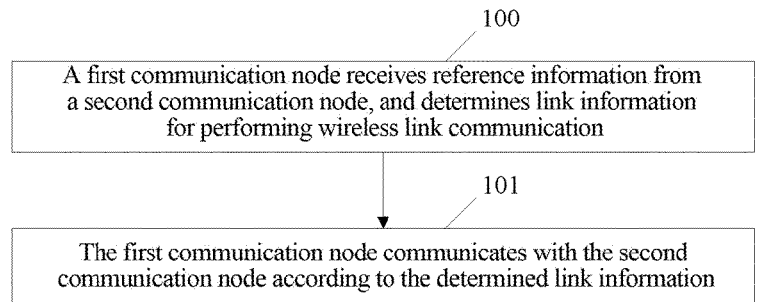
FIG. 1 is a flowchart of a method for realizing wireless link processing according to an embodiment of the present document.

FIG. 1 is a flowchart of a method for realizing wireless link processing according to an embodiment of the present document. As shown in FIG. 1, the method includes the following steps.

In step 100, a first communication node receives reference information from a second communication node, and determines link information for performing wireless link communication.

In this step, the reference information at least includes antenna number information, antenna spacing information and movement speed information of the second communication node; or antenna number information and antenna spacing information of the second communication node; or total antenna group length information and movement speed information of the second communication node; or total antenna group length information of the second communication node; or antenna topology information and movement speed information of the second communication node; or antenna topology information of the second communication node; or a scheduling delay which is allowed when the first communication node communicates with the second communication node; or a period in which the first communication node transmits a downlink reference signal; or a period in which the second communication node transmits an uplink reference signal; or geographical position information and movement speed information of the second communication node; or geographical position information of the second communication node.

When the reference information is antenna number information and antenna spacing information of the second communication node; or total antenna group length information of the second communication node; or antenna topology information of the second communication node; or geographical position information of the second communication node, the method according to the embodiment of the present document further includes: testing by the first communication node to acquire the movement speed information.

It should be illustrated that the method for testing by the first communication node to acquire the movement speed information is a conventional technical means for those skilled in the art, which will not be described in detail herein.

When the reference information is the scheduling delay information which is allowed when the first communication node communicates with the second communication node, the scheduling delay information which is allowed when the first communication node communicates with the second communication node is determined according to the movement speed information and antenna related information of the second communication node.

It should be illustrated that the scheduling delay in the related technology is primarily illustrated from the perspective of the communication quality of an application, and the scheduling delay in the present application is a scheduling delay acquired by analyzing the validity of the channel state information.

When the reference information is the period in which the first communication node transmits the downlink reference signal, the period in which the first communication node transmits the downlink reference signal is determined according to the movement speed information and antenna related information of the second communication node.

When the reference information is the period in which the second communication node transmits the uplink reference signal, the period in which the second communication node transmits the uplink reference signal is determined according to the movement speed information and antenna related information of the second communication node.

The link information at least includes: a scheduling delay which is allowed when the first communication node communicates with the second communication node; or a manner of transmitting service data by the first communication node; or a period in which the first communication node transmits a downlink reference signal; or a period in which the second communication node transmits an uplink reference signal.

Here, the scheduling delay information which is allowed when the first communication node communicates with the second communication node is valid time of channel state information which is related to the second communication node and is acquired by the first communication node.

When the reference information is the antenna number information, the antenna spacing information, and the movement speed information of the second communication node; or when the reference information is the antenna number information and the antenna spacing information of the second communication node, and the first communication node tests to acquire the movement speed information, determining the link information specifically includes the following steps.

The antenna group length information is acquired according to the antenna number information and the antenna spacing information; and, according to the acquired antenna group length information and the movement speed information, a scheduling delay which is allowed when the first communication node communicates with the second communication node is acquired after receiving the latest channel state information of the second communication node, herein the scheduling delay is used as the link information for performing the wireless link communication, or a scheduling period for an uplink reference signal is acquired as the link information for performing the wireless link communication, or a scheduling period for a downlink reference signal is acquired as the link information for performing the wireless link communication.

It should be illustrated that, the methods for acquiring the antenna group length information, acquiring the scheduling delay which is allowed when the first communication node communicates with the second communication node after receiving the latest channel state information of the second communication node, and acquiring the scheduling period for the uplink or downlink reference signal, etc., belong to a common technical means for those skilled in the art, which will not be described in detail herein.

When the reference information is the total antenna group length information and the movement speed information of the second communication node; or when the reference information is the total antenna group length information of the second communication node, and the first communication node tests to acquire the movement speed information, determining the link information specifically includes the following steps.

According to the antenna group length information and the movement speed information, for performing the wireless link communication a scheduling delay which is allowed when the first communication node communicates with the second communication node is acquired after receiving the latest channel state information of the second communication node, herein the scheduling delay is used as the link information for performing wireless link communication; or a scheduling period for an uplink reference signal is acquired as the link information for performing the wireless link communication; or a scheduling period for a downlink reference signal is acquired as the link information for performing the wireless link communication.

When the reference information is the antenna topology information and the movement speed information of the second communication node; or when the reference information is the antenna topology information of the second communication node, and the first communication node tests to acquire the movement speed information, determining the link information specifically includes the following steps.

The antenna group length information is acquired according to the antenna topology information of the second communication node. According to the acquired antenna group length information and movement speed information, for performing the wireless link communication a scheduling delay which is allowed when the first communication node communicates with the second communication node is acquired after receiving the latest channel state information of the second communication node, herein the scheduling delay is used as the link information for performing the wireless link communication; or a scheduling period for an uplink reference signal is acquired as the link information for performing the wireless link communication; or a scheduling period for a downlink reference signal is acquired as the link information for performing the wireless link communication.

It should be illustrated that the determination of the time after the latest channel state information of the second communication node is received belongs to common knowledge for those skilled in the art, which will not be described in detail herein.

When the reference information is the scheduling delay which is allowed when the first communication node communicates with the second communication node, determining the link information specifically includes: the scheduling delay which is allowed when the first communication node communicates with the second communication node is directly used as the link information for performing the wireless link communication.

When the reference information is the period in which the first communication node transmits the downlink reference signal, determining the link information specifically includes: determining the period in which the first communication node transmits the downlink reference signal as the link information for performing the wireless link communication.

When the reference information is the period in which the second communication node transmits the uplink reference signal, determining the link information specifically includes: determining the period in which the second communication node transmits the uplink reference signal as the link information for performing the wireless link communication.

When the reference information is the geographical position information and the movement speed information of the second communication node; or, when the reference information is the geographical position information of the second communication node, and the first communication node tests to acquire the movement speed information, determining the link information specifically includes: the geographical position information and the movement speed information of the second communication node is used as the link information for performing the wireless link communication.

Acquiring the antenna group length information according to the antenna number information and the antenna spacing information specifically includes: subtracting 1 from an antenna number value in the antenna number information and then multiplying with the antenna spacing information, the result used as the antenna group length information.

Acquiring the scheduling period for the uplink reference signal according to the antenna group length information and the movement speed information specifically includes: using a value, which is less than or equal to a value obtained by dividing the antenna group length information by the movement speed information, as the scheduling period for the uplink reference signal.

Acquiring the scheduling period for the downlink reference signal according to the antenna group length information and the movement speed information specifically includes: using a value, which is less than or equal to a value obtained by dividing the antenna group length information by the movement speed information as the scheduling period for the downlink reference signal.

In step 101, the first communication node communicates with the second communication node according to the determined link information.

The first communication node determines the link information for performing the wireless link communication according to the reference information received from the second communication node. Thereby, it is achieved that the first communication node communicates with the second communication node according to the determined link information, and the problem of the degradation of the wireless link performance is solved, which is caused by that the channel characteristic of the receiving party completely changes and the receiving party completely leaves the coverage of spot beams under the high-speed mobile communication environment, thereby enhancing the quality of service of the entire mobile communication system.

When the link information is the scheduling delay which is allowed when the first communication node communicates with the second communication node, the first communication node communicating with the second communication node according to the determined link information specifically includes the following steps. The first communication node communicates with the second communication node based on the latest channel state information within the scheduling delay which is allowed when the first communication node communicates with the second communication node. Or, the first communication node schedules resources of a wide beam which is sufficient to cover a candidate receiving antenna group of the second communication node outside the scheduling delay which is allowed when the first communication node communicates with the second communication node, to communicate with the second communication node.

It should be illustrated that the communication with the second communication node based on the latest channel state information belongs to common knowledge for those skilled in the art which will not be described in detail herein.

When the link information is the scheduling period for the uplink reference signal, the first communication node communicating with the second communication node according to the determined link information specifically includes: the first communication node notifies the second communication node of the scheduling period for the uplink reference signal to perform communication.

When the link information is the scheduling period for the downlink reference signal, the first communication node communicating with the second communication node according to the determined link information specifically includes: the first communication node notifies the second communication node of the scheduling period for the downlink reference signal to perform communication.

It should be illustrated that the content that the first communication node notifies the second communication node of the scheduling period for a downlink reference signal to perform the communication belongs to common knowledge for those skilled in the art, which will not be described in detail herein.

When the link information is the period in which the first communication node transmits the downlink reference signal, the first communication node communicating with the second communication node according to the determined link information specifically includes: a manner of communication is preset according to the period in which the first communication node transmits the downlink reference signal.

When the link information is the period in which the second communication node transmits the uplink reference signal, the first communication node communicating with the second communication node according to the determined link information specifically includes: a manner of communication is preset according to the period in which the second communication node transmits the uplink reference signal.

It is to be illustrated that, presetting the manner of communication refers to a communication manner in default according to a set standard by those skilled in the art, or a suitable set of configuration parameters which is selected from a table, or designed according to signallings which are pre-designed.

When the link information is the geographical position information and the movement speed information of the second communication node, performing the communication according to the determined link information specifically includes: predicting a channel condition for scheduling resources to the second communication node according to the geographical position information and the movement speed information, and selecting a service data transmission manner to perform the communication, which specifically includes the following step.

According to an electronic map including channel state information in combination with the geographical position information and the movement speed information, the channel condition for scheduling resources to the second communication node is predicted, and the service data transmission manner is selected to perform the communication Here, predicting the channel condition for scheduling resources to the second communication node is that: a future position information of the terminal is predicted, and then the channel state information of the corresponding position is extracted from the existing channel state information map according to the position information.

Figure 2:
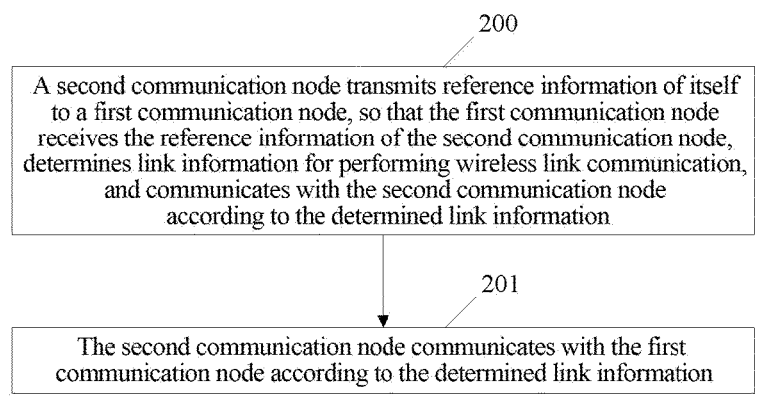
FIG. 2 is a flowchart of another method for realizing wireless link processing according to an embodiment of the present document.

FIG. 2 is a flowchart of another method for realizing wireless link processing according to an embodiment of the present document. As shown in FIG. 2, the method includes the following steps.

In step 200, a second communication node transmits reference information of the second communication node itself to a first communication node, so that the first communication node receives the reference information from the second communication node, determines link information for performing wireless link communication, and communicates with the second communication node according to the determined link information. In an exemplary embodiment, when the movement speed information of the second communication node changes, the second communication node transmits the reference information of itself to the first communication node.

In this step, the reference information at least includes: antenna number information, antenna spacing information and movement speed information of the second communication node; or antenna number information and antenna spacing information of the second communication node; or total antenna group length information and movement speed information of the second communication node; or total antenna group length information of the second communication node; or antenna topology information and movement speed information of the second communication node; or antenna topology information of the second communication node; or a scheduling delay which is allowed when the first communication node communicates with the second communication node; or a period in which the second communication node transmits an uplink reference signal; or a period in which the first communication node transmits a downlink reference signal; or geographical position information and movement speed information of the second communication node; or geographical position information of the second communication node.

When the reference information is antenna number information and antenna spacing information of the second communication node; or total antenna group length information of the second communication node; or antenna topology information of the second communication node; or geographical position information of the second communication node, the method according to the embodiment of the present document further includes: testing by the first communication node to acquire the movement speed information.

Here, the scheduling delay information which is allowed when the first communication node communicates with the second communication node is valid time of channel state information which is related to the second communication node and is acquired by the first communication node.

When the reference information is the scheduling delay information which is allowed when the first communication node communicates with the second communication node, the scheduling delay information which is allowed when the first communication node communicates with the second communication node is determined according to the movement speed information and antenna related information of the second communication node.

when the reference information is the period in which the first communication node transmits the downlink reference signal, the period in which the first communication node transmits the downlink reference signal is determined according to the movement speed information and antenna related information of the second communication node.

when the reference information is the period in which the second communication node transmits the uplink reference signal, the period in which the second communication node transmits the uplink reference signal is determined according to the movement speed information and antenna related information of the second communication node.

The link information at least includes: a scheduling delay which is allowed when the first communication node communicates with the second communication node; or a manner of transmitting service data by the first communication node; or a period in which the first communication node transmits a downlink reference signal; or a period in which the second communication node transmits an uplink reference signal.

When the reference information is the antenna number information, the antenna spacing information, and the movement speed information of the second communication node; or when the reference information is the antenna number information and the antenna spacing information of the second communication node, and the first communication node tests to acquire the movement speed information, determining the link information specifically includes the following step: Antenna group length information is acquired according to the antenna number information and the antenna spacing information. And, according to the acquired antenna group length information and the movement speed information, a scheduling delay which is allowed when the first communication node communicates with the second communication node is acquired after receiving the latest channel state information of the second communication node, herein the scheduling delay is used as the link information for performing the wireless link communication; or, a scheduling period for an uplink reference signal is acquired as the link information for performing the wireless link communication; or, a scheduling period for a downlink reference signal is acquired as the link information for performing the wireless link communication.

When the reference information is the antenna group length information and the movement speed information of the second communication node; or when the reference information is the total antenna group length information of the second communication node, and the first communication node tests to acquire the movement speed information, determining the link information specifically includes the following step: according to the antenna group length information and the movement speed information, for performing the wireless link communication a scheduling delay which is allowed when the first communication node communicates with the second communication node is acquired after receiving the latest channel state information of the second communication node, herein the scheduling delay is used as the link information for performing wireless link communication; or, a scheduling period for an uplink reference signal is acquired as the link information for performing the wireless link communication; or, a scheduling period for a downlink reference signal is acquired as the link information for performing the wireless link communication.

When the reference information is the antenna topology information and the movement speed information of the second communication node; or when the reference information is the antenna topology information of the second communication node, and the first communication node tests to acquire the movement speed information, determining the link information specifically includes the following step. Antenna group length information is acquired according to the antenna topology information of the second communication node. And, according to the acquired antenna group length information and movement speed information, for performing the wireless link communication a scheduling delay which is allowed when the first communication node communicates with the second communication node is acquired after receiving the latest channel state information of the second communication node, herein the scheduling delay is used as the link information for performing wireless link communication; or, a scheduling period for an uplink reference signal is acquired as the link information for performing the wireless link communication; or, a scheduling period for a downlink reference signal is acquired as the link information for performing the wireless link communication.

When the reference information is the scheduling delay which is allowed when the first communication node communicates with the second communication node, determining the link information specifically includes that: the scheduling delay which is allowed when the first communication node communicates with the second communication node is directly used as the link information for performing the wireless link communication.

When the reference information is the period in which the second communication node transmits the uplink reference signal, determining the link information specifically includes that: determining the period in which the second communication node transmits the uplink reference signal as the link information for performing the wireless link communication.

When the reference information is the period in which the first communication node transmits the downlink reference signal, determining the link information specifically includes: determining the period in which the first communication node transmits the downlink reference signal as the link information for performing the wireless link communication.

When the reference information is the geographical position information and the movement speed information of the second communication node; or, when the reference information is the geographical position information of the second communication node, and the first communication node tests to acquire the movement speed information, determining the link information specifically includes that: the geographical position information and the movement speed information of the second communication node is used as the link information for performing the wireless link communication.

In an exemplary embodiment, acquiring the antenna group length information according to the antenna number information and the antenna spacing information specifically includes: subtracting 1 from an antenna number value in the antenna number information and then multiplying with the antenna spacing information, the result used as the antenna group length information.

Acquiring the scheduling period for the uplink reference signal according to the antenna group length information and the movement speed information specifically includes: using a value, which is less than or equal to a value obtained by dividing the antenna group length information by the movement speed information, as the scheduling period for the uplink reference signal.

Acquiring the scheduling period for the downlink reference signal according to the antenna group length information and the movement speed information specifically includes: using a value, which is less than or equal to a value obtained by dividing the antenna group length information by the movement speed information as the scheduling period for the downlink reference signal.

When the link information is the scheduling delay which is allowed when the first communication node communicates with the second communication node, the second communication node communicating with the first communication node according to the determined link information specifically includes that: the first communication node communicates with the second communication node based on the latest channel state information within the scheduling delay which is allowed when the first communication node communicates with the second communication node; or, the first communication node schedules resources of a wide beam which is sufficient to cover a candidate receiving antenna group of the second communication node outside the scheduling delay which is allowed when the first communication node communicates with the second communication node, to communicate with the second communication node.

When the link information is the scheduling period for the uplink reference signal, the second communication node communicating with the first communication node according to the determined link information specifically includes that: the first communication node notifies the second communication node of the scheduling period for the uplink reference signal to perform communication.

When the link information is the scheduling period for the downlink reference signal, the second communication node communicating with the first communication node according to the determined link information specifically includes that: the first communication node notifies the second communication node of the scheduling period for the downlink reference signal to perform communication.

When the link information is the period in which the first communication node transmits the downlink reference signal, the second communication node communicating with the first communication node according to the determined link information specifically includes that: a manner of communication is preset according to the period in which the first communication node transmits the downlink reference signal.

When the link information is the period in which the second communication node transmits the uplink reference signal, the second communication node communicating with the first communication node according to the determined link information specifically includes that: a manner of communication is preset according to the period in which the second communication node transmits the uplink reference signal.

When the link information is the geographical position information and the movement speed information of the second communication node, the second communication node communicating with the first communication node according to the determined link information specifically includes that: a channel condition for scheduling resources to the second communication node is predicted according to the geographical position information and the movement speed information, and a service data transmission manner is selected to perform the communication. More specifically, according to an electronic map including channel state information in combination with the geographical position information and the movement speed information, the channel condition for scheduling resources to the second communication node is predicted, and the service data transmission manner is selected to perform communication.

In step 201, the second communication node communicates with the first communication node according to the determined link information.

Figure 3:
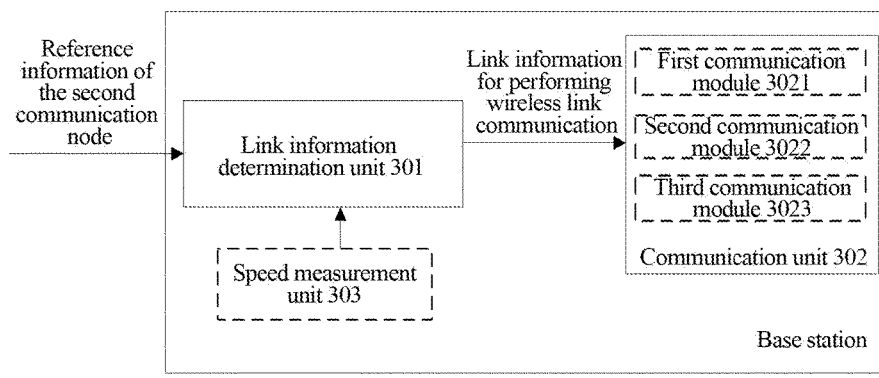
FIG. 3 is a structural block diagram of a base station according to an embodiment of the present document.

FIG. 3 is a structural block diagram of a base station according to an embodiment of the present document. As shown in FIG. 3, the base station includes a link information determination unit 301 and a communication unit 302.

The link information determination unit 301 is arranged to receive reference information from a second communication node and determine link information for performing wireless link communication.

The reference information at least includes: antenna number information, antenna spacing information and movement speed information of the second communication node; or antenna number information and antenna spacing information of the second communication node; or total antenna group length information and movement speed information of the second communication node; or total antenna group length information of the second communication node; or antenna topology information and movement speed information of the second communication node; or antenna topology information of the second communication node; or a scheduling delay which is allowed when the base station communicates with the second communication node; or a period in which the second communication node transmits an uplink reference signal; or a period in which the base station transmits a downlink reference signal; or geographical position information and movement speed information of the second communication node; or geographical position information of the second communication node.

The base station according to the embodiment of the present document further includes a speed measurement unit 303. The speed measurement unit 303 is arranged to, when the reference information is antenna number information and antenna spacing information of the second communication node; or total antenna group length information of the second communication node; or antenna topology information of the second communication node; or geographical position information of the second communication node, test to acquire the movement speed information.

The link information at least includes: a scheduling delay which is allowed when the base station communicates with the second communication node; or a manner of transmitting service data by the second communication node; or a period in which the second communication node transmits an uplink reference signal, or a period in which the base station transmits a downlink reference signal.

When the reference information is the scheduling delay information which is allowed when the base station communicates with the second communication node, the scheduling delay information which is allowed when the base station communicates with the second communication node is determined according to the movement speed information and antenna related information of the second communication node.

When the reference information is the period in which the base station transmits the downlink reference signal, the period in which the base station transmits the downlink reference signal is determined according to the movement speed information and antenna related information of the second communication node.

When the reference information is the period in which the second communication node transmits the uplink reference signal, the period in which the second communication node transmits the uplink reference signal is determined according to the movement speed information and antenna related information of the second communication node.

The scheduling delay information which is allowed when the base station communicates with the second communication node is valid time of channel state information which is related to the second communication node and is acquired by the base station.

The link information determination unit 301 is further arranged to, when the reference information is the antenna number information, the antenna spacing information, and the movement speed information of the second communication node; or when the reference information is the antenna number information and the antenna spacing information of the second communication node, and the speed measurement unit acquires the movement speed information, acquire antenna group length information according to the antenna number information and the antenna spacing information; and according to the acquired antenna group length information and the movement speed information, acquire a scheduling delay which is allowed when the first communication node communicates with the second communication node after receiving the latest channel state information of the second communication node, herein the scheduling delay is used as the link information for performing the wireless link communication; or, acquire a scheduling period for an uplink reference signal, as the link information for performing the wireless link communication; or, acquire a scheduling period for a downlink reference signal, as the link information for performing the wireless link communication;

when the reference information is the total antenna group length information and the movement speed information of the second communication node; or when the reference information is the total antenna group length information of the second communication node, and the speed measurement unit acquires the movement speed information, according to the antenna group length information and the movement speed information, acquire for performing the wireless link communication a scheduling delay which is allowed when the first communication node communicates with the second communication node after receiving the latest channel state information of the second communication node, herein the scheduling delay is used as the link information for performing wireless link communication; or, acquire a scheduling period for an uplink reference signal, as the link information for performing the wireless link communication; or, acquire a scheduling period for a downlink reference signal, as the link information for performing the wireless link communication;

when the reference information is the antenna topology information and the movement speed information of the second communication node; or when the reference information is the antenna topology information of the second communication node, and the speed measurement unit acquires the movement speed information, acquire antenna group length information according to the antenna topology information of the second communication node; and according to the acquired antenna group length information and movement speed information, acquire for performing the wireless link communication a scheduling delay which is allowed when the first communication node communicates with the second communication node after receiving the latest channel state information of the second communication node, herein the scheduling delay is used as the link information for performing wireless link communication; or, acquire a scheduling period for an uplink reference signal, as the link information for performing the wireless link communication; or, acquire a scheduling period for a downlink reference signal, as the link information for performing the wireless link communication;

when the reference information is the scheduling delay which is allowed when the first communication node communicates with the second communication node, use directly the scheduling delay which is allowed when the first communication node communicates with the second communication node as the link information for performing the wireless link communication.

The communication unit 302 is arranged to communicate with the second communication node according to the determined link information.

The communication unit 302 includes a first communication module 3021, a second communication module 3022 and a third communication module 3023.

The first communication module 3021 is arranged to, when the determined link information is the scheduling delay which is allowed when the base station communicates with the second communication node, communicate by the base station with the second communication node based on the latest channel state information within the scheduling delay which is allowed when the base station communicates with the second communication node; or, schedule by the base station resources of a wide beam which is sufficient to cover a candidate receiving antenna group of the second communication node outside the scheduling delay which is allowed when the base station communicates with the second communication node, to communicate with the second communication node.

The second communication module 3022 is arranged to, when the determined link information is the scheduling period for the uplink reference signal, notify by the base station the second communication node of the scheduling period for the uplink reference signal to perform resource scheduling; when the determined link information is the scheduling period for the downlink reference signal, notify by the base station the second communication node of the scheduling period for the downlink reference signal to perform communication; when the determined link information is the period in which the base station transmits the downlink reference signal, preset a manner of communication according to the period in which the base station transmits the downlink reference signal; and when the determined link information is the period in which the second communication node transmits the uplink reference signal, preset a manner of communication according to the period in which the second communication node transmits the uplink reference signal.

The third communication module 3023 is arranged to, when the determined link information is the geographical position information and the movement speed information of the second communication node, predict a channel condition for scheduling resources to the second communication node according to the geographical position information and the movement speed information, and select a service data transmission manner to perform the communication.

The third communication module 3023 is further arranged to: according to an electronic map including the channel state information in combination with the geographical position information and the movement speed information predict the channel condition for scheduling resources to the second communication node, and select the service data transmission manner to perform the communication.

Figure 4:
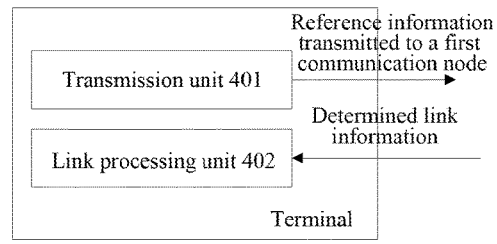
FIG. 4 is a structural block diagram of a terminal according to an embodiment of the present document.

FIG. 4 is a structural block diagram of a terminal according to an embodiment of the present document. As shown in FIG. 4, the terminal includes a transmission unit 401 and a link processing unit 402.

The transmission unit 401 is arranged to transmit reference information of the terminal to a first communication node, so that the first communication node receives the reference information of the terminal, determines link information for performing wireless link communication, and communicates with the terminal according to the determined link information. The link processing unit 402 is arranged to communicate with the first communication node according to the determined link information.

The transmission unit 401 is further arranged to transmit to the first communication node the reference information which at least includes: antenna number information, antenna spacing information and movement speed information of the terminal; or antenna number information and antenna spacing information of the terminal; or total antenna group length information and movement speed information of the terminal; or total antenna group length information of the terminal; or antenna topology information and movement speed information of the terminal; or antenna topology information of the terminal; or a scheduling delay which is allowed when the first communication node communicates with the terminal; or a period in which the terminal transmits an uplink reference signal; or a period in which the first communication node transmits a downlink reference signal; or reference information which is geographical position information and movement speed information of the terminal; or geographical position information of the terminal, so that the first communication node determines the link information for performing the wireless link communication according to the reference information, and generates resource scheduling information according to the link information for performing the wireless link communication.

The transmission unit 401 is further arranged to, when the movement speed information of the terminal changes, transmit the reference information of the terminal to the first communication node, so that the first communication node determines the link information for performing the wireless link communication according to the reference information and generates resource scheduling information according to the link information for performing the wireless link communication.

The present document will be described in detail below by specific embodiments at the base station side, and the embodiments are not used to limit the protection scope of the present document.

In order to facilitate the presentation in the embodiments, the first communication node is taken as a base station and the second communication node is taken as a terminal, the antenna number information is defined as X, the antenna spacing information is defined as Y, the movement speed information is defined as V, the antenna group length information is defined as Z, and the scheduling delay which is allowed when the base station communicates with the terminal is defined as T.

Figure 5:
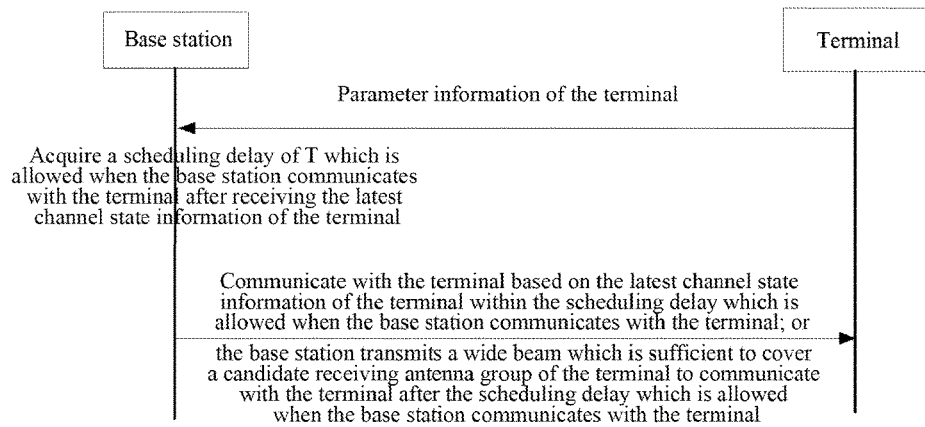
FIG. 5 is a flowchart of a method according to embodiments one to seven of the present document.

FIG. 5 is a flowchart of a method according to embodiments one to seven of the present document. Herein, contents of parameter information in the embodiments are different, but the data link information for performing the wireless data link processing is the scheduling delay which is allowed when the base station communicates with the terminal. The methods for performing communication processing are also the same.

Embodiment One

A base station receives parameter information transmitted by a terminal, herein the parameter information at least includes the antenna number information X, the antenna spacing information Y and the movement speed information V of the terminal.

The base station acquires the antenna group length information Z of the terminal based on the antenna number information X and the antenna spacing information Y, and optionally, $Z=Y*(X-1)$.

The base station acquires a scheduling delay of T which is allowed when the base station communicates with the terminal after receiving the latest channel state information of the terminal based on the antenna group length information Z and the movement speed information V (i.e., if the valid time of the channel state information is greater than that delay, reliability of the channel state information degrades sharply). Optionally, $T=Z/V$.

The base station communicates with the terminal based on the latest channel state information of the terminal within the scheduling delay of T which is allowed when the base station communicates with the terminal. Or, the base station transmits a wide beam which is sufficient to cover a candidate receiving antenna group of the terminal to communicate with the terminal after the scheduling delay of T which is allowed when the base station communicates with the terminal.

Embodiment Two

A base station receives parameter information transmitted by a terminal, herein the parameter information at least includes the antenna group length information Z and the movement speed information V of the terminal.

The base station acquires a scheduling delay of T which is allowed when the base station communicates with the terminal after receiving the latest channel state information of the terminal based on the antenna group length information Z and the movement speed information V. Optionally, $T=Z/V$.

The base station communicates with the terminal based on the latest channel state information of the terminal within the scheduling delay of T which is allowed when the base station communicates with the terminal. Or, the base station transmits a wide beam which is sufficient to cover a candidate receiving antenna group of the terminal to communicate with the terminal after the scheduling delay of T which is allowed when the base station communicates with the terminal.

Embodiment Three

A base station receives parameter information transmitted by a terminal, herein the parameter information at least includes the antenna topology information and the movement speed information V of the terminal. In an exemplary embodiment, the antenna topology information at least includes an antenna shape, an antenna number, antenna performance, etc.

The base station acquires the antenna group length information Z of the terminal based on the antenna topology information.

The base station acquires a scheduling delay of T which is allowed when the base station communicates with the terminal after receiving the latest channel state information of the terminal based on the antenna group length information Z and the movement speed information V (i.e., if the valid time of the channel state information is greater than that delay, reliability of the channel state information degrades sharply). Optionally, $T=Z/V$.

The base station communicates with the terminal based on the latest channel state information of the terminal within the scheduling delay of T which is allowed when the base station communicates with the terminal. Or, the base station transmits a wide beam which is sufficient to cover a candidate receiving antenna group of the terminal to communicate with the terminal after the scheduling delay of T which is allowed when the base station communicates with the terminal.

Embodiment Four

A base station receives parameter information transmitted by a terminal, herein the parameter information at least includes the antenna number information X, the antenna spacing information Y of the terminal, but does not include the movement speed information V.

The base station acquires the antenna group length information Z of the terminal based on the antenna number information X and the antenna spacing information Y, and optionally, $Z=Y*(X-1)$.

The base station performs a test to acquire the movement speed information V of the terminal, and acquires a scheduling delay of T which is allowed when the base station communicates with the terminal after receiving the latest channel state information of the terminal based on the antenna group length information Z and the movement speed information V. Optionally, $T=Z/V$.

The base station communicates with the terminal based on the latest channel state information of the terminal within the scheduling delay of T which is allowed when the base station communicates with the terminal. Or, the base station transmits a wide beam which is sufficient to cover a candidate receiving antenna group of the terminal to communicate with the terminal after the scheduling delay of T which is allowed when the base station communicates with the terminal.

Embodiment Five

A base station receives parameter information transmitted by a terminal, herein the parameter information at least includes the antenna group length information Z of the terminal, but does not include the movement speed information V.

The base station performs a test to acquire the movement speed information V of the terminal, and acquires a scheduling delay of T which is allowed when the base station communicates with the terminal after receiving the latest channel state information of the terminal based on the antenna group length information Z and the movement speed information V. Optionally, $T=Z/V$.

The base station communicates with the terminal based on the latest channel state information of the terminal within the scheduling delay of T which is allowed when the base station communicates with the terminal. Or, the base station transmits a wide beam which is sufficient to cover a candidate receiving antenna group of the terminal to communicate with the terminal after the scheduling delay of T which is allowed when the base station communicates with the terminal.

Embodiment Six

A base station receives parameter information transmitted by a terminal, herein the parameter information at least includes the antenna topology information of the terminal, which includes an antenna shape, an antenna number, antenna performance, etc., but does not include the movement speed information V.

The base station acquires the antenna group length information Z of the terminal based on the antenna information.

The base station performs a test to acquire the movement speed information V of the terminal, and acquires a scheduling delay of T which is allowed when the base station communicates with the terminal after receiving the latest channel state information of the terminal based on the antenna group length information Z and the movement speed information V. Optionally, T=Z/V.

The base station communicates with the terminal based on the latest channel state information of the terminal within the scheduling delay of T which is allowed when the base station communicates with the terminal. Or, the base station transmits a wide beam which is sufficient to cover a candidate receiving antenna group of the terminal to communicate with the terminal after the scheduling delay of T which is allowed when the base station communicates with the terminal.

Embodiment Seven

A base station receives parameter information transmitted by a terminal, herein the parameter information at least includes a scheduling delay of T which is allowed when the base station communicates with the terminal.

The base station communicates with the terminal based on the latest channel state information of the terminal within the scheduling delay of T which is allowed when the base station communicates with the terminal. Or, the base station transmits a wide beam which is sufficient to cover a candidate receiving antenna group of the terminal to communicate with the terminal after the scheduling delay of T which is allowed when the base station communicates with the terminal.

In the embodiments one to seven, the data link information for performing the wireless data link processing is the scheduling delay which is allowed when the base station communicates with the terminal.

Figure 6:
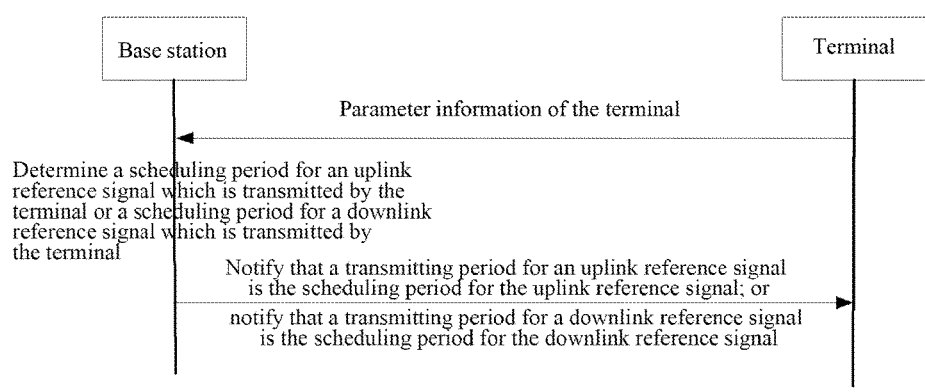
FIG. 6 is a flowchart of a method according to embodiments eight to thirteen of the present document.

FIG. 6 is a flowchart of a method according to embodiments eight to thirteen of the present document. Herein, contents of parameter information in the embodiments are different. However, the data link information for performing wireless data link processing is a scheduling period for an uplink reference signal or a scheduling period for a downlink reference signal.

Embodiment Eight

A base station receives parameter information transmitted by a terminal, herein the parameter information at least includes the antenna number information X, the antenna spacing information Y and the movement speed information V of the terminal.

The base station acquires the antenna group length information Z of the terminal based on the antenna number information X and the antenna spacing information Y. Optionally, Z=Y*(X−1).

The base station determines a scheduling period for an uplink reference signal transmitted by the terminal based on the antenna group length information Z and the movement speed information V. In an exemplary embodiment, the scheduling period for the uplink reference signal is less than or equal to a quotient obtained by dividing the antenna group length information Z by the movement speed information.

The base station notifies the terminal that a transmitting period for the uplink reference signal is the scheduling period for the uplink reference signal, to perform the communication.

Or, the base station determines a scheduling period for a downlink reference signal transmitted by the base station based on the antenna group length information Z and the movement speed information V. In an exemplary embodiment, the scheduling period for the downlink reference signal is less than or equal to a quotient obtained by dividing the antenna group length information Z by the movement speed information.

The base station notifies the terminal that a transmitting period for the downlink reference signal is the scheduling period for the downlink reference signal, to perform the communication.

Embodiment Nine

A base station receives parameter information transmitted by a terminal, herein the parameter information at least includes the antenna group length information Z and the movement speed information V of the terminal.

The base station determines a scheduling period for an uplink reference signal transmitted by the terminal based on the antenna group length information Z and the movement speed information V. In an exemplary embodiment, the scheduling period for the uplink reference signal is less than or equal to a quotient obtained by dividing the antenna group length information Z by the movement speed information.

The base station notifies the terminal that a transmitting period for the uplink reference signal is the scheduling period for the uplink reference signal, to perform the communication.

Or, the base station determines a scheduling period for a downlink reference signal transmitted by the base station based on the antenna group length information Z and the movement speed information V. In an exemplary embodiment, the scheduling period for the downlink reference signal is less than or equal to a quotient obtained by dividing the antenna group length information Z by the movement speed information.

The base station notifies the terminal that a transmitting period for the downlink reference signal is the scheduling period for the downlink reference signal, to perform the communication.

Embodiment Ten

A base station receives parameter information transmitted by a terminal, herein the parameter information at least includes the antenna topology information and the movement speed information V of the terminal. In an exemplary embodiment, the antenna topology information at least includes an antenna shape, an antenna number, antenna performance, etc.

The base station acquires the antenna group length information Z of the terminal based on the antenna topology information.

The base station determines a scheduling period for an uplink reference signal transmitted by the terminal based on the antenna group length information Z and the movement speed information V. In an exemplary embodiment, the scheduling period for the uplink reference signal is less than or equal to a quotient obtained by dividing the antenna group length information Z by the movement speed information.

The base station notifies the terminal that a transmitting period for the uplink reference signal is the scheduling period for the uplink reference signal, to perform the communication.

Or, the base station determines a scheduling period for a downlink reference signal transmitted by the base station based on the antenna group length information Z and the movement speed information V. In an exemplary embodiment, the scheduling period for the downlink reference signal is less than or equal to a quotient obtained by dividing the antenna group length information Z by the movement speed information.

The base station notifies the terminal that a transmitting period for the downlink reference signal is the scheduling period for the downlink reference signal, to perform the communication.

Embodiment Eleven

A base station receives parameter information transmitted by a terminal, herein the parameter information at least includes the antenna number information X and the antenna spacing information Y of the terminal, but does not include the movement speed information V.

The base station acquires the antenna group length information Z of the terminal based on the antenna number information X and the antenna spacing information Y. Optionally, Z=Y*(X-1).

The base station performs a test to acquire the movement speed information V of the terminal, and determines a scheduling period for an uplink reference signal transmitted by the terminal based on the antenna group length information Z and the measured movement speed information V. In an exemplary embodiment, the scheduling period for the uplink reference signal is less than or equal to a quotient obtained by dividing the antenna group length information Z by the movement speed information.

The base station notifies the terminal that a transmitting period for the uplink reference signal is the scheduling period for the uplink reference signal, to perform the communication.

Or, the base station determines a scheduling period for a downlink reference signal transmitted by the base station based on the antenna group length information Z and the movement speed information V. In an exemplary embodiment, the scheduling period for the downlink reference signal is less than or equal to a quotient obtained by dividing the antenna group length information Z by the movement speed information.

The base station notifies the terminal that a transmitting period for the downlink reference signal is the scheduling period for the downlink reference signal, to perform the communication.

Embodiment Twelve

A base station receives parameter information transmitted by a terminal, herein the parameter information at least includes the antenna group length information Z of the terminal, but does not include the movement speed information V.

The base station performs a test to acquire the movement speed information V of the terminal, and determines a scheduling period for an uplink reference signal transmitted by the terminal based on the antenna group length information Z and the measured movement speed information V. In an exemplary embodiment, the scheduling period for the uplink reference signal is less than or equal to a quotient obtained by dividing the antenna group length information Z by the movement speed information.

The base station notifies the terminal that a transmitting period for the uplink reference signal is the scheduling period for the uplink reference signal, to perform the communication.

Or, the base station determines a scheduling period for a downlink reference signal transmitted by the base station based on the antenna group length information Z and the movement speed information V. In an exemplary embodiment, the scheduling period for the downlink reference signal is less than or equal to a quotient obtained by dividing the antenna group length information Z by the movement speed information.

The base station notifies the terminal that a transmitting period for the downlink reference signal is the scheduling period for the downlink reference signal, to perform the communication.

Embodiment Thirteen

A base station receives parameter information transmitted by a terminal, herein the parameter information at least includes the antenna topology information of the terminal, which includes an antenna shape, an antenna number, antenna performance, etc., but does not include the movement speed information V.

The base station acquires the antenna group length information Z of the terminal based on the antenna information.

The base station performs a test to acquire the movement speed information V of the terminal, and determines a scheduling period for an uplink reference signal transmitted by the terminal based on the antenna group length information Z and the measured movement speed information V. In an exemplary embodiment, the scheduling period for the uplink reference signal is less than or equal to a quotient obtained by dividing the antenna group length information Z by the movement speed information.

The base station notifies the terminal that a transmitting period for the uplink reference signal is the scheduling period for the uplink reference signal, to perform the communication.

Or, the base station determines a scheduling period for a downlink reference signal transmitted by the base station based on the antenna group length information Z and the movement speed information V. In an exemplary embodiment, the scheduling period for the downlink reference signal is less than or equal to a quotient obtained by dividing the antenna group length information Z by the movement speed information.

The base station notifies the terminal that a transmitting period for the downlink reference signal is the scheduling period for the downlink reference signal, to perform the communication.

Embodiment Fourteen

A base station receives parameter information transmitted by a terminal, herein the parameter information at least includes a period of an uplink reference signal of the terminal.

The period of the uplink reference signal is determined as the link information for performing the wireless link communication.

A manner of communication is preset according to the period of the uplink reference signal.

Embodiment Fifteen

A base station receives parameter information transmitted by a terminal, herein the parameter information at least includes a period of a downlink reference signal desired by the terminal.

The period of the downlink reference signal is determined as the link information for performing the wireless link communication.

A manner of communication is preset according to the period of the downlink reference signal.

Embodiment Sixteen

A base station receives parameter information transmitted by a terminal, herein the parameter information at least includes the geographical position information and the movement speed information V of the terminal.

According to the geographical position information and the movement speed information, a channel condition for scheduling resources to the second communication node is predicted and a service data transmission manner is selected, to perform the communication.

In an exemplary embodiment, according to an electronic map including the channel state information in combination with the geographical position information and the movement speed information, the channel condition for scheduling resources to the second communication node is predicted and the service data transmission manner is selected, to perform the communication.

Embodiment Seventeen

A base station receives parameter information transmitted by a terminal, herein the parameter information at least includes the geographical position information of the terminal, but does not include the movement speed information.

The base station performs a test to acquire the movement speed information V of the terminal.

According to the geographical position information and the movement speed information, a channel condition for scheduling resources to the second communication node is predicted and a service data transmission manner is selected, to perform the communication.

In an exemplary embodiment, according to an electronic map including the channel state information in combination with the geographical position information and the movement speed information, the channel condition for scheduling resources to the second communication node is predicted and the service data transmission manner is selected, to perform the communication.

Embodiment Eighteen

A base station receives parameter information transmitted by a terminal, herein the parameter information at least includes the geographical position information, the antenna topology information and the movement speed information of the terminal.

The base station, according to the geographical position information, the antenna topology information and the movement speed information, predicts a channel condition for scheduling resources to the second communication node and selects a service data transmission manner, to perform communication.

In an exemplary embodiment, according to an electronic map including the channel state information in combination with the geographical position information and the movement speed information, the channel condition for scheduling resources to the second communication node is predicted and the service data transmission manner is selected, to perform the communication.

Embodiment Nineteen

A base station receives parameter information transmitted by a terminal, herein the parameter information at least includes the geographical position information and the antenna topology information of the terminal.

The base station, according to the geographical position information and the antenna topology information, predicts a channel condition for scheduling resources to the second communication node and selects a service data transmission manner, to perform the communication.

In an exemplary embodiment, according to an electronic map including the channel state information in combination with the geographical position information and the movement speed information, the channel condition for scheduling resources to the second communication node is predicted and the service data transmission manner is selected, to perform the communication.

The present document will be described in detail below by specific embodiments at the terminal side, and the embodiments are not used to limit the protection scope of the present document.

In order to facilitate the presentation in the embodiments, the first communication node is taken as a base station and the second communication node is taken as a terminal, the antenna number information is defined as X, the antenna spacing information is defined as Y, the movement speed information is defined as V, the antenna group length information is defined as Z, and the scheduling delay which is allowed when the base station communicates with the terminal is defined as T.

Embodiment Twenty

A terminal transmits parameter information, herein the parameter information at least includes the antenna number information X, the antenna spacing information Y and the movement speed information V of the terminal.

The base station receives the parameter information transmitted by the terminal.

The base station acquires the antenna group length information Z of the terminal based on the antenna number information X and the antenna spacing information Y, and optionally, $Z=Y*(X-1)$.

The base station acquires a scheduling delay of T which is allowed when the base station communicates with the terminal after receiving the latest channel state information of the terminal based on the antenna group length information Z and the movement speed information V (i.e., if the valid time of the channel state information is greater than that delay, reliability of the channel state information degrades sharply). Optionally, T=Z/V.

The base station communicates with the terminal based on the latest channel state information of the terminal within the scheduling delay of T which is allowed when the base station communicates with terminal. Or, the base station transmits a wide beam which is sufficient to cover a candidate receiving antenna group of the terminal to communicate with the terminal after the scheduling delay of T which is allowed when the base station communicates with the terminal.

The terminal communicates with the base station according to the communication manner as determined above.

Embodiment Twenty-One

A terminal transmits parameter information, herein the parameter information at least includes the antenna group length information Z and the movement speed information V of the terminal.

The base station receives the parameter information transmitted by the terminal.

The base station acquires a scheduling delay of T which is allowed when the base station communicates with the terminal after receiving the latest channel state information of the terminal based on the antenna group length information Z and the movement speed information V. Optionally, T=Z/V.

The base station communicates with the terminal based on the latest channel state information of the terminal within the scheduling delay of T which is allowed when the base station communicates with the terminal. Or, the base station transmits a wide beam which is sufficient to cover a candidate receiving antenna group of the terminal to communicate with the terminal after the scheduling delay of T which is allowed when the base station communicates with the terminal.

The terminal communicates with the base station according to the communication manner as determined above.

Embodiment Twenty-Two

A terminal transmits parameter information, herein the parameter information at least includes the antenna topology information and the movement speed information V of the terminal. In an exemplary embodiment, the antenna topology information at least includes an antenna shape, an antenna number, antenna performance, etc.

The base station receives the parameter information transmitted by the terminal.

The base station acquires the antenna group length information Z of the terminal based on the antenna topology information.

The base station acquires a scheduling delay of T which is allowed when the base station communicates with the terminal after receiving the latest channel state information of the terminal based on the antenna group length information Z and the movement speed information V (i.e., if the valid time of the channel state information is greater than that delay, reliability of the channel state information degrades sharply). Optionally, T=Z/V.

The base station communicates with the terminal based on the latest channel state information of the terminal within the scheduling delay of T which is allowed when the base station communicates with the terminal. Or, the base station transmits a wide beam which is sufficient to cover a candidate receiving antenna group of the terminal to communicate with the terminal after the scheduling delay of T which is allowed when the base station communicates with the terminal.

The terminal communicates with the base station according to the communication manner as determined above.

Embodiment Twenty-Three

A terminal transmits parameter information, herein the parameter information at least includes the antenna number information X and the antenna spacing information Y of the terminal.

The base station receives the parameter information transmitted by the terminal. The base station acquires the antenna group length information Z of the terminal based on the antenna number information X and the antenna spacing information Y, and optionally, Z=Y*(X−1).

The base station performs a test to acquire the movement speed information V of the terminal, and acquires a scheduling delay of T which is allowed when the base station communicates with the terminal after receiving the latest channel state information of the terminal based on the antenna group length information Z and the movement speed information V. Optionally, T=Z/V.

The base station communicates with the terminal based on the latest channel state information of the terminal within the scheduling delay of T which is allowed when the base station communicates with the terminal. Or, the base station transmits a wide beam which is sufficient to cover a candidate receiving antenna group of the terminal to communicate with the terminal after the scheduling delay of T which is allowed when the base station communicates with the terminal.

The terminal communicates with the base station according to the communication manner as determined above.

Embodiment Twenty-Four

A terminal transmits parameter information, herein the parameter information at least includes the antenna group length information Z of the terminal, but does not include the movement speed information V.

The base station receives the parameter information transmitted by the terminal.

The base station performs a test to acquire the movement speed information V of the terminal, and acquires a scheduling delay of T which is allowed when the base station communicates with the terminal after receiving the latest channel state information of the terminal based on the antenna group length information Z and the movement speed information V. Optionally, T=Z/V.

The base station communicates with the terminal based on the latest channel state information of the terminal within the scheduling delay of T which is allowed when the base station communicates with the terminal. Or, the base station transmits a wide beam which is sufficient to cover a candidate receiving antenna group of the terminal to communicate with the terminal after the scheduling delay of T which is allowed when the base station communicates with the terminal.

The terminal communicates with the base station according to the communication manner as determined above.

Embodiment Twenty-Five

A terminal transmits parameter information, herein the parameter information at least includes the antenna topology information (which includes an antenna shape, an antenna number, antenna performance, etc.) of the terminal, but does not include the movement speed information V.

The base station receives the parameter information transmitted by the terminal.

The base station acquires the antenna group length information Z of the terminal based on the antenna information.

The base station performs a test to acquire the movement speed information V of the terminal, and acquires a scheduling delay of T which is allowed when the base station communicates with the terminal after receiving the latest channel state information of the terminal based on the antenna group length information Z and the movement speed information V. Optionally, T=Z/V.

The base station communicates with the terminal based on the latest channel state information of the terminal within the scheduling delay of T which is allowed when the base station communicates with the terminal. Or, the base station transmits a wide beam which is sufficient to cover a candidate receiving antenna group of the terminal to communicate with the terminal after the scheduling delay of T which is allowed when the base station communicates with the terminal.

The terminal communicates with the base station according to the communication manner determined above.

Embodiment Twenty-Six

A terminal transmits parameter information, herein the parameter information at least includes a scheduling delay of T which is allowed when the base station communicates with the terminal.

The base station communicates with the terminal based on the latest channel state information of the terminal within the scheduling delay of T which is allowed when the base station communicates with the terminal. Or, the base station transmits a wide beam which is sufficient to cover a candidate receiving antenna group of the terminal to communicate with the terminal after the scheduling delay of T which is allowed when the base station communicates with the terminal.

The terminal communicates with the base station according to the communication manner as determined above.

Embodiment Twenty-Seven

A terminal transmits parameter information, herein the parameter information at least includes antenna number information X, antenna spacing information Y and movement speed information V of the terminal.

The base station receives the parameter information transmitted by the terminal.

The base station acquires the antenna group length information Z of the terminal based on the antenna number information X and the antenna spacing information Y. Optionally, Z=Y*(X-1).

The base station determines a scheduling period for an uplink reference signal transmitted by the terminal based on the antenna group length information Z and the movement speed information V. In an exemplary embodiment, the scheduling period for the uplink reference signal is less than or equal to a quotient obtained by dividing the antenna group length information Z by the movement speed information.

The base station notifies the terminal that a transmitting period for the uplink reference signal is the scheduling period for the uplink reference signal, to perform the communication.

Or, the base station determines a scheduling period for a downlink reference signal transmitted by the base station based on the antenna group length information Z and the movement speed information V. In an exemplary embodiment, the scheduling period for the downlink reference signal is less than or equal to a quotient obtained by dividing the antenna group length information Z by the movement speed information.

The base station notifies the terminal that a transmitting period for the downlink reference signal is the scheduling period for the downlink reference signal, to perform the communication.

The terminal communicates with the base station according to the scheduling period for the downlink reference signal.

Embodiment Twenty-Eight

A terminal transmits parameter information, herein the parameter information at least includes the antenna group length information Z and the movement speed information V of the terminal.

The base station receives the parameter information transmitted by the terminal.

The base station determines a scheduling period for an uplink reference signal transmitted by the terminal based on the antenna group length information Z and the movement speed information V. In an exemplary embodiment, the scheduling period for the uplink reference signal is less than or equal to a quotient obtained by dividing the antenna group length information Z by the movement speed information.

The base station notifies the terminal that a transmitting period for the uplink reference signal is the scheduling period for the uplink reference signal, to perform the communication.

Or, the base station determines a scheduling period for a downlink reference signal transmitted by the base station based on the antenna group length information Z and the movement speed information V. In an exemplary embodiment, the scheduling period for the downlink reference signal is less than or equal to a quotient obtained by dividing the antenna group length information Z by the movement speed information.

The base station notifies the terminal that a transmitting period for the downlink reference signal is the scheduling period for the downlink reference signal, to perform the communication.

The terminal communicates with the base station according to the scheduling period for the downlink reference signal.

Embodiment Twenty-Nine

A terminal transmits parameter information, herein the parameter information at least includes the antenna topology information and the movement speed information V of the terminal. In an exemplary embodiment, the antenna topology information at least includes an antenna shape, an antenna number, antenna performance, etc.

The base station acquires the antenna group length information Z of the terminal based on the antenna topology information.

The base station determines a scheduling period for an uplink reference signal transmitted by the terminal based on the antenna group length information Z and the movement speed information V. In an exemplary embodiment, the scheduling period for the uplink reference signal is less than or equal to a quotient obtained by dividing the antenna group length information Z by the movement speed information.

The base station notifies the terminal that a transmitting period for the uplink reference signal is the scheduling period for the uplink reference signal, to perform the communication.

Or, the base station determines a scheduling period for a downlink reference signal transmitted by the base station based on the antenna group length information Z and the movement speed information V. In an exemplary embodiment, the scheduling period for the downlink reference signal is less than or equal to a quotient obtained by dividing the antenna group length information Z by the movement speed information.

The base station notifies the terminal that a transmitting period for the downlink reference signal is the scheduling period for the downlink reference signal, to perform the communication.

The terminal communicates with the base station according to the scheduling period for the downlink reference signal.

Embodiment Thirty

A terminal transmits parameter information, herein the parameter information at least includes the antenna number information X and the antenna spacing information Y of the terminal, but does not include the movement speed information V.

The base station acquires the antenna group length information Z of the terminal based on the antenna number information X and the antenna spacing information Y. Optionally, $Z=Y*(X-1)$.

The base station performs a test to acquire the movement speed information V of the terminal, and determines a scheduling period for an uplink reference signal transmitted by the terminal based on the antenna group length information Z and the measured movement speed information V. In an exemplary embodiment, the scheduling period for the uplink reference signal is less than or equal to a quotient obtained by dividing the antenna group length information Z by the movement speed information.

The base station notifies the terminal that a transmitting period for the uplink reference signal is the scheduling period for the uplink reference signal, to perform the communication.

Or, the base station determines a scheduling period for a downlink reference signal transmitted by the base station based on the antenna group length information Z and the movement speed information V. In an exemplary embodiment, the scheduling period for the downlink reference signal is less than or equal to a quotient obtained by dividing the antenna group length information Z by the movement speed information.

The base station notifies the terminal that a transmitting period for the downlink reference signal is the scheduling period for the downlink reference signal, to perform the communication.

The terminal communicates with the base station according to the scheduling period for the downlink reference signal.

Embodiment Thirty-One

A terminal transmits parameter information, herein the parameter information at least includes the antenna group length information Z of the terminal, but does not include the movement speed information V.

The base station performs a test to acquire the movement speed information V of the terminal, and determines a scheduling period for an uplink reference signal transmitted by the terminal based on the antenna group length information Z and the measured movement speed information V. In an exemplary embodiment, the scheduling period for the uplink reference signal is less than or equal to a quotient obtained by dividing the antenna group length information Z by the movement speed information.

The base station notifies the terminal that a transmitting period for the uplink reference signal is the scheduling period for the uplink reference signal, to perform the communication.

Or, the base station determines a scheduling period for a downlink reference signal transmitted by the base station based on the antenna group length information Z and the movement speed information V. In an exemplary embodiment, the scheduling period for the downlink reference signal is less than or equal to a quotient obtained by dividing the antenna group length information Z by the movement speed information.

The base station notifies the terminal that a transmitting period for the downlink reference signal is the scheduling period for the downlink reference signal, to perform the communication.

The terminal communicates with the base station according to the scheduling period for the downlink reference signal.

Embodiment Thirty-Two

A terminal transmits parameter information, herein the parameter information at least includes the antenna topology information of the terminal, which includes an antenna shape, an antenna number, antenna performance, etc., but does not include the movement speed information V.

The base station acquires the antenna group length information Z of the terminal based on the antenna information.

The base station performs a test to acquire the movement speed information V of the terminal, and determines a scheduling period for an uplink reference signal transmitted by the terminal based on the antenna group length information Z and the measured movement speed information V. In an exemplary embodiment, the scheduling period for the uplink reference signal is less than or equal to a quotient obtained by dividing the antenna group length information Z by the movement speed information.

The base station notifies the terminal that a transmitting period for the uplink reference signal is the scheduling period for the uplink reference signal, to perform the communication.

Or, the base station determines a scheduling period for a downlink reference signal transmitted by the base station based on the antenna group length information Z and the movement speed information V. In an exemplary embodiment, the scheduling period for the downlink reference signal is less than or equal to a quotient obtained by dividing the antenna group length information Z by the movement speed information.

The base station notifies the terminal that a transmitting period for the downlink reference signal is the scheduling period for the downlink reference signal, to perform the communication.

The terminal communicates with the base station according to the scheduling period for the downlink reference signal.

Embodiment Thirty-Three

A terminal transmits parameter information, herein the parameter information at least includes a period for transmitting a downlink reference signal.

A base station receives the parameter information transmitted by the terminal.

The base station uses the period for transmitting the downlink reference signal as the link information for performing the wireless link communication.

A manner of communication is preset according to the period for transmitting the downlink reference signal.

The terminal performs the communication according to the manner of communication preset by the base station.

Embodiment Thirty-Four

A terminal transmits parameter information, herein the parameter information at least includes a period for transmitting an uplink reference signal.

A base station receives the parameter information transmitted by the terminal.

The base station uses the period for transmitting the uplink reference signal as the link information for performing the wireless link communication.

A manner of communication is preset according to the period for transmitting the downlink reference signal.

The terminal performs the communication according to the manner of communication preset by the base station.

Embodiment Thirty-Five

A terminal transmits parameter information, herein the parameter information at least includes the geographical position information and the movement speed information V of the terminal.

According to the geographical position information and the movement speed information, a channel condition for scheduling resources to the second communication node is predicted and a service data transmission manner is selected, to perform the communication.

In an exemplary embodiment, according to an electronic map including the channel state information in combination with the geographical position information and the movement speed information, the channel condition for scheduling resources to the second communication node is predicted and the service data transmission manner is selected, to perform the communication.

The terminal performs the communication according to the service data transmission manner selected by the base station.

Embodiment Thirty-Six

A terminal transmits parameter information, herein the parameter information at least includes the geographical position information of the terminal, but does not include the movement speed information.

The base station performs a test to acquire the movement speed information V of the terminal.

According to the geographical position information and the movement speed information, a channel condition for scheduling resources to the second communication node is predicted and a service data transmission manner is selected, to perform the communication.

In an exemplary embodiment, according to an electronic map including the channel state information in combination with the geographical position information and the movement speed information, the channel condition for scheduling resources to the second communication node is predicted and the service data transmission manner is selected, to perform the communication.

The terminal performs the communication according to the service data transmission manner selected by the base station.

Embodiment Thirty-Seven

A base station receives parameter information transmitted by a terminal, herein the parameter information at least includes the geographical position information, the antenna topology information and the movement speed information of the terminal.

The base station, according to the geographical position information, the antenna topology information and the movement speed information, predicts a channel condition for scheduling resources to the second communication node and selects a service data transmission manner, to perform communication.

In an exemplary embodiment, according to an electronic map including the channel state information in combination with the geographical position information and the movement speed information, the channel condition for scheduling resources to the second communication node is predicted and the service data transmission manner is selected, to perform the communication.

The terminal performs the communication according to the service data transmission manner selected by the base station.

Embodiment Thirty-Eight

A base station receives parameter information transmitted by a terminal, herein the parameter information at least includes the geographical position information and the antenna topology information of the terminal.

The base station, according to the geographical position information and the antenna topology information, predicts a channel condition for scheduling resources to the second communication node and selects a service data transmission manner, to perform the communication.

In an exemplary embodiment, according to an electronic map including the channel state information in combination with the geographical position information and the movement speed information, the channel condition for scheduling resources to the second communication node is predicted and the service data transmission manner is selected, to perform the communication.

The terminal performs the communication according to the service data transmission manner selected by the base station.

Embodiment Thirty-Nine

When the movement speed information of a terminal changes, the terminal transmits reference information of the terminal itself to a base station.

The base station receives the reference information transmitted by the terminal.

The base station determines a scheduling delay which is allowed when the base station communicates with the terminal, or a manner of transmitting service data by the terminal using different resources, or a period for transmitting an uplink reference signal by the terminal, or a period for transmitting a downlink reference signal by the base station.

Although the implementations of the present application are disclosed as above, the disclosure is only implementations which are used to facilitate understanding the present application rather than limit the present application, for example, a specific implementation method in the implementations of the present document. For any skilled in the art to which the present application belongs, any modification and change can be made in form and detail of the implementations without departing from the spirit and scope disclosed by the present application, and the patent protection scope of the present application should still be subject to the scope defined by the appended claims.

INDUSTRIAL APPLICABILITY

In the technical solution of the present document, the link information for performing the wireless link communication is determined according to the reference information of the second communication node as a receiving party, to realize that the first communication node communicates with the second communication node according to the determined link information, which solves the problem of degradation of the wireless link performance under a high-speed mobile communication environment because the channel characteristics of the receiving party completely changes and the receiving party completely leave the coverage of the spot beam, and enhances the quality of service of the entire mobile communication system. Therefore, the present document has very strong industrial applicability.

What is claimed is:

1. A method for realizing wireless link processing, comprising:
   receiving, by a first communication node, reference information transmitted by a second communication node, and determining link information for performing wireless link communication; and
   communicating, by the first communication node, with the second communication node according to the determined link information,
   wherein the reference information comprises: antenna number information, antenna spacing information and movement speed information of the second communication node; or
   antenna number information and antenna spacing information of the second communication node; or
   antenna group length information and movement speed information of the second communication node; or
   antenna group length information of the second communication node; or
   antenna topology information and movement speed information of the second communication node; or
   antenna topology information of the second communication node; or
   a scheduling delay which is allowed when the first communication node communicates with the second communication node; or
   a period in which the first communication node transmits a downlink reference signal; or
   a period in which the second communication node transmits an uplink reference signal; or
   geographical position information and movement speed information of the second communication node; or
   geographical position information of the second communication node,
   wherein when the reference information is the antenna number information, the antenna spacing information, and the movement speed information of the second communication node; or when the reference information is the antenna number information and the antenna spacing information of the second communication node, and the first communication node tests to acquire the movement speed information,
   the step of determining the link information for performing the wireless link communication comprises:
      acquiring antenna group length information according to the antenna number information and the antenna spacing information; and
      acquiring, according to the acquired antenna group length information and the movement speed information, a scheduling delay which is allowed when the first communication node communicates with the second communication node after receiving the latest channel state information of the second communication node, wherein the scheduling delay is used as the link information for performing the wireless link communication; or acquiring, according to the acquired antenna group length information and movement speed information, a scheduling period for an uplink reference signal, as the link information for performing the wireless link communication; or acquiring, according to the acquired antenna group length information and movement speed information, a scheduling period for a downlink reference signal, as the link information for performing the wireless link communication;
   when the reference information is the antenna group length information and the movement speed information of the second communication node; or when the reference information is the antenna group length information of the second communication node, and the first communication node tests to acquire the movement speed information,
   the step of determining the link information for performing the wireless link communication comprises:
      acquiring, according to the antenna group length information and the movement speed information, a scheduling delay which is allowed when the first communication node communicates with the second communication node after receiving the latest channel state information of the second communication node, wherein the scheduling delay is used as the link information for performing the wireless link communication; or acquiring, according to the antenna group length information and the movement speed information, a scheduling period for an uplink reference signal, as the link information for performing the wireless link communication; or acquiring, according to the antenna group length information and the movement speed information, a scheduling period for a downlink reference signal, as the link information for performing the wireless link communication;
   when the reference information is the antenna topology information and the movement speed information of the second communication node; or when the reference information is the antenna topology information of the second communication node, and the first communication node tests to acquire the movement speed information, the step of determining the link information for performing the wireless link communication comprises:
acquiring antenna group length information according to the antenna topology information of the second communication node; and
acquiring, according to the acquired antenna group length information and movement speed information, a scheduling delay which is allowed when the first communication node communicates with the second communication node after receiving the latest channel state information of the second communication node, wherein the scheduling delay is used as the link information for performing wireless link communication; or acquiring, according to the acquired antenna group length information and movement speed information, a scheduling period for an uplink reference signal, as the link information for performing the wireless link communication; or acquiring, according to the acquired antenna group length information and movement speed information, a scheduling period for a downlink reference signal, as the link information for performing the wireless link communication; and when the reference information is the scheduling delay which is allowed when the first communication node communicates with the second communication node, the step of determining the link information for performing the wireless link communication comprises:
using directly the scheduling delay which is allowed when the first communication node communicates with the second communication node as the link information for performing the wireless link communication, wherein the step of acquiring the antenna group length information according to the antenna number information and the antenna spacing information comprises:
subtracting 1 from an antenna number value in the antenna number information and then multiplying with the antenna spacing information, the result used as the antenna group length information;

the step of acquiring the scheduling period for the uplink reference signal according to the antenna group length information and the movement speed information comprises:
using a value, which is less than or equal to a value obtained by dividing the antenna group length information by the movement speed information, as the scheduling period for the uplink reference signal; and the step of acquiring the scheduling period for the downlink reference signal according to the antenna group length information and the movement speed information comprises:
using a value, which is less than or equal to a value obtained by dividing the antenna group length information by the movement speed information as the scheduling period for the downlink reference signal.

2. The method according to claim 1, wherein the method further comprises: testing by the first communication node to acquire the movement speed information of the second communication node when the reference information is the following information:
antenna number information and antenna spacing information of the second communication node; or
antenna group length information of the second communication node; or
antenna topology information of the second communication node; or
geographical position information of the second communication node.

3. The method according to claim 1, wherein the link information comprises:
a scheduling delay which is allowed when the first communication node communicates with the second communication node; or
a manner of transmitting service data by the first communication node; or
a period in which the first communication node transmits a downlink reference signal; or
a period in which the second communication node transmits an uplink reference signal.

4. The method according to claim 1, wherein when the reference information is the scheduling delay information which is allowed when the first communication node communicates with the second communication node, the scheduling delay information which is allowed when the first communication node communicates with the second communication node is determined according to the movement speed information and antenna related information of the second communication node;
when the reference information is the period in which the first communication node transmits the downlink reference signal, the period in which the first communication node transmits the downlink reference signal is determined according to the movement speed information and antenna related information of the second communication node; and
when the reference information is the period in which the second communication node transmits the uplink reference signal, the period in which the second communication node transmits the uplink reference signal is determined according to the movement speed information and antenna related information of the second communication node.

5. The method according to claim 4, wherein the scheduling delay information which is allowed when the first communication node communicates with the second communication node is valid time of channel state information which is related to the second communication node and is acquired by the first communication node.

6. The method according to claim 1, wherein
when the link information is the scheduling delay which is allowed when the first communication node communicates with the second communication node, the step of the first communication node communicating with the second communication node according to the determined link information comprises:
the first communication node communicating with the second communication node based on the latest channel state information within the scheduling delay which is allowed when the first communication node communicates with the second communication node; or the first communication node scheduling resources of a wide beam which is sufficient to cover a candidate receiving antenna group of the second communication node outside the scheduling delay which is allowed when the first communication node communicates with the second communication node, to communicate with the second communication node;
when the link information is the scheduling period for the uplink reference signal, the step of the first communication node communicating with the second communication node according to the determined link information comprises:

the first communication node notifying the second communication node of the scheduling period for the uplink reference signal to perform communication; and when the link information is the scheduling period for the downlink reference signal, the step of the first communication node communicating with the second communication node according to the determined link information comprises:

the first communication node notifying the second communication node of the scheduling period for the downlink reference signal to perform communication.

7. The method according to claim 1, wherein when the reference information is the period in which the first communication node transmits the downlink reference signal, the step of determining the link information for performing the wireless link communication comprises:

determining the period in which the first communication node transmits the downlink reference signal as the link information for performing the wireless link communication; and when the reference information is the period in which the second communication node transmits the uplink reference signal, the step of determining the link information for performing the wireless link communication comprises:

determining the period in which the second communication node transmits the uplink reference signal as the link information for performing the wireless link communication.

8. The method according to claim 3, wherein when the link information is the period in which the first communication node transmits the downlink reference signal, the step of the first communication node communicating with the second communication node according to the determined link information comprises:

presetting a manner of communication according to the period in which the first communication node transmits the downlink reference signal; and when the link information is the period in which the second communication node transmits the uplink reference signal, the step of the first communication node communicating with the second communication node according to the determined link information comprises:

presetting a manner of communication according to the period in which the second communication node transmits the uplink reference signal.

9. The method according to claim 2, wherein when the reference information is the geographical position information and the movement speed information of the second communication node; or, when the reference information is the geographical position information of the second communication node, and the first communication node tests to acquire the movement speed information;

the step of determining the link information for performing the wireless link communication comprises:

using the geographical position information and the movement speed information of the second communication node, as the link information for performing the wireless link communication.

10. The method according to claim 3, wherein when the link information is the geographical position information and the movement speed information of the second communication node, the step of performing the communication according to the determined link information comprises:

predicting a channel condition for scheduling resources to the second communication node according to the geographical position information and the movement speed information, and selecting a service data transmission manner to perform the communication.

11. The method according to claim 10, wherein the step of predicting the channel condition for scheduling resources to the second communication node according to the geographical position information and the movement speed information, and selecting the service data transmission manner to perform the communication comprises:

according to an electronic map including channel state information in combination with the geographical position information and the movement speed information, predicting the channel condition for scheduling resources to the second communication node, and selecting the service data transmission manner to perform the communication.

12. The method according to claim 1, wherein the step of the second communication node transmitting the reference information of the second communication node to the first communication node comprises:

when the movement speed information of the second communication node changes, the second communication node transmitting the reference information of the second communication node to the first communication node.

13. A base station, comprising a link information determination unit and a communication unit, wherein the link information determination unit is arranged to receive reference information from a second communication node, and determine link information for performing wireless link communication; and the communication unit is arranged to communicate with the second communication node according to the link information determined by the link information determination unit;

wherein the reference information comprises: antenna number information, antenna spacing information and movement speed information of the second communication node; or antenna number information and antenna spacing information of the second communication node; or antenna group length information and movement speed information of the second communication node; or antenna group length information of the second communication node; or antenna topology information and movement speed information of the second communication node; or antenna topology information of the second communication node; or a scheduling delay which is allowed when the base station communicates with the second communication node; or a period in which the second communication node transmits an uplink reference signal; or a period in which the base station transmits a downlink reference signal; or geographical position information and movement speed information of the second communication node; or geographical position information of the second communication node, wherein
the link information determination unit is arranged to determine the link information for performing the wireless link communication by:
when the reference information is the antenna number information, the antenna spacing information, and the movement speed information of the second communication node; or when the parameter information is the antenna number information and the antenna spacing information of the second communication node, and the speed measurement unit acquires the movement speed information,
    acquiring antenna group length information according to the antenna number information and the antenna spacing information; and
    acquiring, according to the acquired antenna group length information and the movement speed information, a scheduling delay which is allowed when the first communication node communicates with the second communication node after receiving the latest channel state information of the second communication node, wherein the scheduling delay is used as the link information for performing the wireless link communication; or acquiring, according to the acquired antenna group length information and movement speed information, a scheduling period for an uplink reference signal, as the link information for performing the wireless link communication; or acquiring, according to the acquired antenna group length information and movement speed information, a scheduling period for a downlink reference signal, as the link information for performing the wireless link communication;
when the reference information is the antenna group length information and the movement speed information of the second communication node; or when the parameter information is the antenna group length information of the second communication node, and the speed measurement unit acquires the movement speed information,
    acquiring, according to the antenna group length information and the movement speed information, for performing the wireless link communication a scheduling delay which is allowed when the first communication node communicates with the second communication node after receiving the latest channel state information of the second communication node, wherein the scheduling delay is used as the link information for performing wireless link communication; or acquiring, according to the antenna group length information and the movement speed information, a scheduling period for an uplink reference signal, as the link information for performing the wireless link communication; or acquiring, according to the antenna group length information and the movement speed information, a scheduling period for a downlink reference signal, as the link information for performing the wireless link communication;
when the reference information is the antenna topology information and the movement speed information of the second communication node; or when the parameter information is the antenna topology information of the second communication node, and the speed measurement unit acquires the movement speed information,
    acquiring antenna group length information according to the antenna topology information of the second communication node; and
    acquiring, according to the acquired antenna group length information and movement speed information, for performing the wireless link communication a scheduling delay which is allowed when the first communication node communicates with the second communication node after receiving the latest channel state information of the second communication node, wherein the scheduling delay is used as the link information for performing wireless link communication; or acquiring, according to the acquired antenna group length information and movement speed information, a scheduling period for an uplink reference signal, as the link information for performing the wireless link communication; or acquiring, according to the acquired antenna group length information and movement speed information, a scheduling period for a downlink reference signal, as the link information for performing the wireless link communication; and
when the reference information is the scheduling delay which is allowed when the first communication node communicates with the second communication node, using directly the scheduling delay which is allowed when the first communication node communicates with the second communication node as the link information for performing the wireless link communication,
wherein acquiring the antenna group length information according to the antenna number information and the antenna spacing information comprises:
subtracting 1 from an antenna number value in the antenna number information and then multiplying with the antenna spacing information, the result used as the antenna group length information;
acquiring the scheduling period for the uplink reference signal according to the antenna group length information and the movement speed information comprises:
using a value, which is less than or equal to a value obtained by dividing the antenna group length information by the movement speed information, as the scheduling period for the uplink reference signal; and
acquiring the scheduling period for the downlink reference signal according to the antenna group length information and the movement speed information comprises:
using a value, which is less than or equal to a value obtained by dividing the antenna group length information by the movement speed information as the scheduling period for the downlink reference signal.

14. A terminal, comprising a transmission unit and a link processing unit, wherein
the transmission unit is arranged to transmit reference information of the terminal to a first communication node, so that the first communication node receives the reference information of the terminal, determines link information for performing wireless link communication, and communicates with the terminal according to the determined link information; and
the link processing unit is arranged to communicate with the first communication node according to the determined link information, wherein the transmission unit is arranged to transmit to the first communication node any one of the following reference information:

antenna number information, antenna spacing information and movement speed information of the terminal; or antenna number information and antenna spacing information of the terminal; or antenna group length information and movement speed information of the terminal; or antenna group length information of the terminal; or antenna topology information and movement speed information of the terminal; or antenna topology information of the terminal; or a scheduling delay which is allowed when the first communication node communicates with the terminal; or a period in which the terminal transmits an uplink reference signal; or a period in which the first communication node transmits a downlink reference signal; or reference information which is geographical position information and movement speed information of the terminal; or geographical position information of the terminal, so that the first communication node determines the link information for performing the wireless link communication according to the reference information, and generates resource scheduling information according to the link information for performing the wireless link communication;

wherein the transmission unit is arranged to, when the movement speed information of the terminal changes, transmit the reference information of the terminal to the first communication node, so that the first communication node determines the link information for performing the wireless link communication according to the reference information and generates resource scheduling information according to the link information for performing the wireless link communication.

* * * * *